United States Patent
Huang et al.

(10) Patent No.: US 11,032,717 B2
(45) Date of Patent: Jun. 8, 2021

(54) METHOD AND APPARATUS FOR IMPROVING COEXISTENCE PERFORMANCE BY MEASUREMENTS IN WIRELESS COMMUNICATION SYSTEMS

(71) Applicant: Samsung Electronics Co., Ltd., Suwon-si (KR)

(72) Inventors: Pengda Huang, Dallas, TX (US); Hao Chen, Plano, TX (US); Chance Tarver, Sulphur, LA (US); Boon Loong Ng, Plano, TX (US); Vikram Chandrasekhar, Mountain View, CA (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/143,178

(22) Filed: Sep. 26, 2018

(65) Prior Publication Data

US 2019/0104489 A1  Apr. 4, 2019

Related U.S. Application Data

(60) Provisional application No. 62/567,557, filed on Oct. 3, 2017, provisional application No. 62/595,738, filed on
(Continued)

(51) Int. Cl.
*H04B 7/022* (2017.01)
*H04B 17/309* (2015.01)
(Continued)

(52) U.S. Cl.
CPC .......... *H04W 16/14* (2013.01); *H04B 7/022* (2013.01); *H04B 17/309* (2015.01);
(Continued)

(58) Field of Classification Search
CPC ......... H04B 7/02–0495; H04B 17/0082–0087; H04B 17/30–3913; H04J 11/0023–0093;
(Continued)

(56) References Cited

U.S. PATENT DOCUMENTS 8,325,621 B2 * 12/2012 Simonsson ........... H04W 52/40
370/252
2016/0135055 A1  5/2016 Bhorkar
(Continued)

FOREIGN PATENT DOCUMENTS

| WO | 2017/023056 A1 | 2/2017 |
| WO | 2017/065852 A1 | 4/2017 |
| WO | 2017/156368 A1 | 9/2017 |

OTHER PUBLICATIONS

International Search Report dated Jan. 15, 2019 in connection with International Patent Application No. PCT/KR2018/011681, 3 pages.
(Continued)

*Primary Examiner* — Timothy J Weidner

(57) ABSTRACT

A method of operating a base station (BS) for a coexistence operation in a wireless communication system is provided. The method comprises performing a first measurement of first signals received from neighbor BSs over channels that are shared with the neighbor BSs before receipt of a spectrum access grant from a network entity; generating a registration request comprising a first measurement report based on the first measurement of the first signals; transmitting, to the network entity, the registration request comprising the first measurement report of the first signals; receiving the spectrum access grant from the network entity; and performing a second measurement of second signals received from the neighbor BSs over the channels that are shared with the neighbor BSs after receiving the spectrum access grant from the network entity.

19 Claims, 28 Drawing Sheets

Related U.S. Application Data on Dec. 7, 2017, provisional application No. 62/609,023, filed on Dec. 21, 2017.

(51) Int. Cl.

| | |
|---|---|
| *H04B 17/382* | (2015.01) |
| *H04J 11/00* | (2006.01) |
| *H04L 5/00* | (2006.01) |
| *H04W 8/18* | (2009.01) |
| *H04W 8/24* | (2009.01) |
| *H04W 16/14* | (2009.01) |
| *H04W 24/10* | (2009.01) |
| *H04W 48/16* | (2009.01) |
| *H04W 60/00* | (2009.01) |
| *H04W 72/14* | (2009.01) |
| *H04W 74/08* | (2009.01) |
| *H04W 84/02* | (2009.01) |
| *H04W 88/02* | (2009.01) |
| *H04W 88/08* | (2009.01) |
| *H04W 88/12* | (2009.01) |
| *H04W 88/18* | (2009.01) |
| *H04W 92/02* | (2009.01) |
| *H04W 92/10* | (2009.01) |
| *H04W 92/12* | (2009.01) |
| *H04W 92/20* | (2009.01) |
| *H04W 92/22* | (2009.01) |
| *H04W 84/04* | (2009.01) |

(52) U.S. Cl.
CPC .......... *H04B 17/382* (2015.01); *H04J 11/005* (2013.01); *H04J 11/0026* (2013.01); *H04L 5/005* (2013.01); *H04L 5/0048* (2013.01); *H04L 5/0057* (2013.01); *H04L 5/0073* (2013.01); *H04W 8/186* (2013.01); *H04W 8/24* (2013.01); *H04W 24/10* (2013.01); *H04W 48/16* (2013.01); *H04W 60/00* (2013.01); *H04W 72/14* (2013.01); *H04W 74/0808* (2013.01); *H04W 84/042* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01); *H04W 92/20* (2013.01); *H04W 92/22* (2013.01)

(58) Field of Classification Search
CPC .. H04J 2011/0003–0096; H04L 5/0001–0098; H04W 8/005–245; H04W 16/02–16; H04W 24/02–10; H04W 28/20–26; H04W 36/0005–385; H04W 40/24–32; H04W 48/02–20; H04W 56/001–0025; H04W 60/00–06; H04W 72/04–14; H04W 74/002–0891; H04W 76/10–19; H04W 84/005; H04W 84/02; H04W 84/04–045; H04W 84/10–12; H04W 88/005; H04W 88/02; H04W 88/08–182; H04W 92/02–06; H04W 92/12–16; H04W 92/20–24
See application file for complete search history.

(56) References Cited

U.S. PATENT DOCUMENTS

| | | |
|---|---|---|
| 2017/0055193 A1 | 2/2017 | Mueck et al. |
| 2017/0086194 A1 | 3/2017 | Tavildar et al. |
| 2018/0132241 A1* | 5/2018 | Gayde ............... H04W 72/0453 455/452.2 |
| 2018/0220459 A1 | 8/2018 | Park et al. |
| 2018/0279316 A1* | 9/2018 | Mueck ................ H04B 17/345 370/252 |

OTHER PUBLICATIONS

Written Opinion of the International Searching Authority dated Jan. 15, 2019 in connection with International Patent Application No. PCT/KR2018/011681, 7 pages.

Marko Palola, et al., "Field trial of the 3.5 GHz citizens broadband radio service governed by a spectrum access systems (SAS)", 2017 IEEE International Symposium on Dynamic Spectrum Access Networks (DySPAN), Mar. 6-9, 2017, 9 pages.

"3rd Generation Partnership Project; Technical Specification Group Radio Access Network; Evolved Universal Terrestrial Radio Access (E-UTRA); Physical Channels and Modulation (Release 14)," 3GPP TS 36.211, V14.4.0, Sep. 2017, 197 pages.

"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.4.0, Sep. 2017, 198 pages.

"Report and Order and Second Further Notice of Proposed Rulemaking," Before the Federal Communications Commission, In the Matter of Amendment of the Commsssision's Rules with Regard to Commercial Operations in the 3550-3650 MHz Band, Apr. 21, 2015, 187 pages.

"Signaling Protocols and Procedures for Citizens Broadband Radio Service (CBRS): Spectrum Access System (SAS)—Citizens Broadband Radio Service Device (CBSD) Interface Technical Specification," Document WINNF-16-S-0016, Version V1.0.1. Dec. 22, 2016, 62 pages.

Meshkati, F., et al., "CBRS Coexistence Technical Report," CBRS Alliance Technical WG: Coexistence TG, CBRS Coexistence Technical Report, C-TG-17-117, Jul. 24, 2017, 21 pages.

\* cited by examiner

METHOD AND APPARATUS FOR
IMPROVING COEXISTENCE
PERFORMANCE BY MEASUREMENTS IN
WIRELESS COMMUNICATION SYSTEMS

CROSS-REFERENCE TO RELATED
APPLICATIONS AND CLAIM OF PRIORITY

The present application claims priority to:
U.S. Provisional Patent Application Ser. No. 62/567,557, filed on Oct. 3, 2017;
U.S. Provisional Patent Application Ser. No. 62/595,738, filed on Dec. 7, 2017; and
U.S. Provisional Patent Application Ser. No. 62/609,023, filed on Dec. 21, 2017;
The content of the above-identified patent documents is incorporated herein by reference.

TECHNICAL FIELD

The present disclosure relates generally to wireless communication systems and, more specifically, to coexistence performance by measurements in an advanced wireless communication system.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

Embodiments of the present disclosure provide methods and apparatuses for improving coexistence performance by measurement in a wireless communication system.

In one embodiment, a base station (BS) for a coexistence operation in a wireless communication system is provided. The BS comprises at least one processor configured to perform a first measurement of first signals received from neighbor BSs over channels that are shared with the neighbor BSs before receipt of a spectrum access grant from a network entity and generate a registration request comprising a first measurement report based on the first measurement of the first signals. The BS further comprises a transceiver operably connected to the at least one processor, the transceiver configured to transmit, to the network entity, the registration request comprising the first measurement report of the first signals and receive the spectrum access grant from the network entity. The at least one processor is further configured to perform a second measurement of second signals received from the neighbor BS over the channels that are shared with the neighbor BSs after receiving the spectrum access grant from the network entity.

In another embodiment, a network entity for a coexistence operation in a wireless communication system is provided. The network entity comprises a transceiver configured to receive, from a base station (BS), a registration request comprising a first measurement report based on a first measurement of first signals, wherein the first measurement is based on the first signals transmitted from neighbor BSs over channels the BS shares with the neighbor BSs before transmission of a spectrum access grant to the BS. The network entity further comprises at least one processor operably connected to the transceiver, the at least one processor configured to generate the spectrum access grant based on the registration request comprising the first measurement report. The transceiver is further configured to transmit, to the BS, the spectrum access grant for a second measurement of second signals transmitted from the neighbor BSs over the channels the BS shares with the neighbor BSs performed after transmitting the spectrum access grant to the BS.

In yet another embodiment, a method of operating a base station (BS) for a coexistence operation in a wireless communication system is provided. The method comprises performing a first measurement of first signals received from neighbor BSs over channels that are shared with the neighbor BSs before receipt of a spectrum access grant from a network entity, generating a registration request comprising a first measurement report based on the first measurement of the first signals, transmitting, to the network entity, the registration request comprising the first measurement report of the first signals, receiving the spectrum access grant from the network entity, and performing a second measurement of second signals received from the neighbor BSs over the channels that are shared with the neighbor BSs after receiving the spectrum access grant from the network entity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
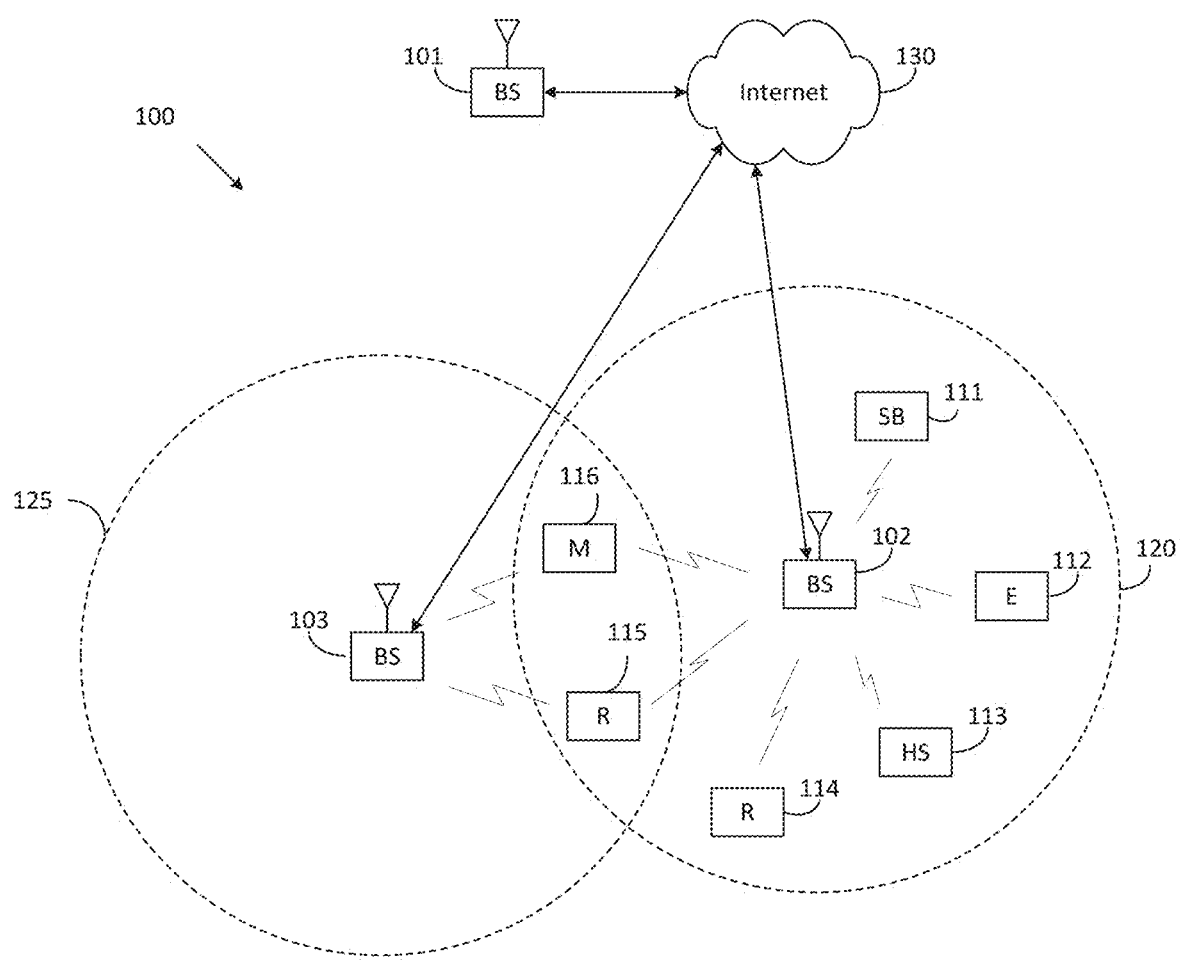
FIG. 1 illustrates an example wireless network according to embodiments of the present disclosure.

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: CBRS Coexistence Technical Report, ver.0.6; WINNF-16-S-0016-V1.0.1 Ver. 1.0.1, "Signaling protocols and procedures for citizens broadband radio service (CBRS): spectrum access system (SAS)-Citizens broadband radio service device (CBSD) interface technical specification." 22 Dec. 2016; Federal Communications Commission, "Report and order and second further notice of proposed rulemaking." April, 2015; 3GPP TS 36.211 v14.4.0, "E-UTRA, Physical channels and modulation;" and 3GPP TS 36.212 v14.4.0, "E-UTRA, Multiplexing and Channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
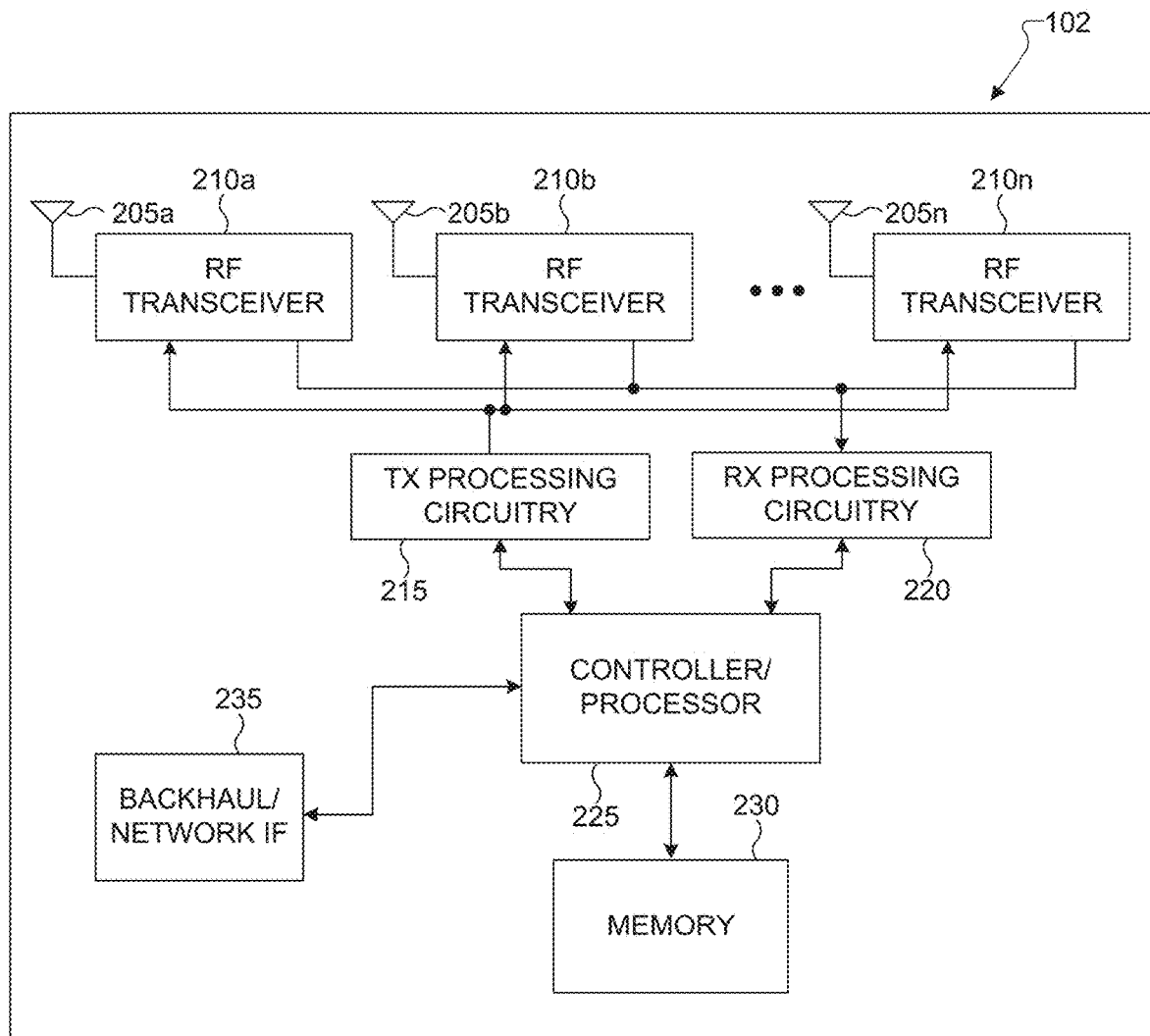
FIG. 2 illustrates an example eNB according to embodiments of the present disclosure.
Figure 3:
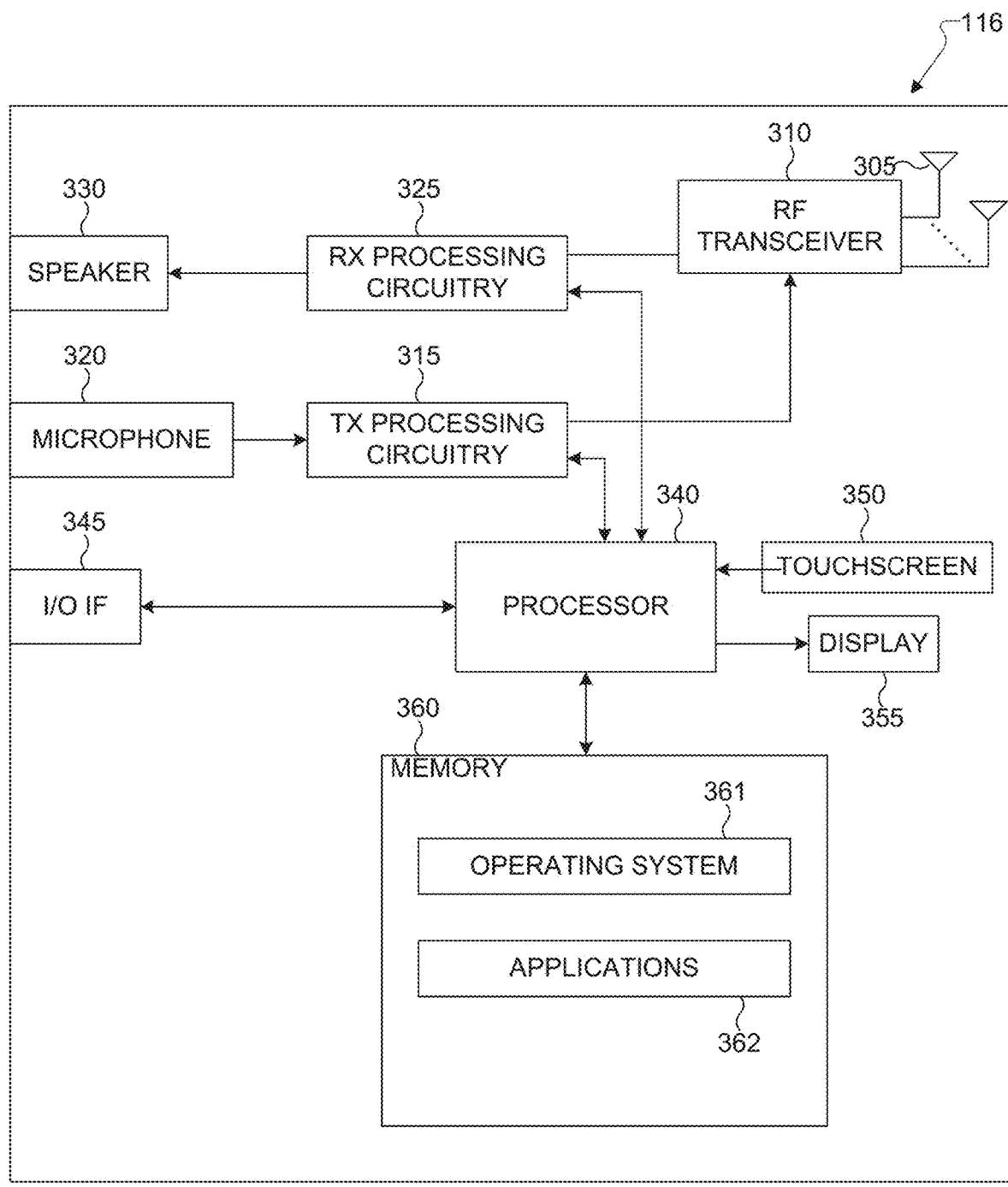
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, one or more of the UEs 111-116 include circuitry, programing, or a combination thereof, for improving coexistence performance by measurements in an advanced wireless communication system. In certain embodiments, and one or more of the eNBs 101-103 includes circuitry, programing, or a combination thereof, for improving coexistence performance by measurements in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
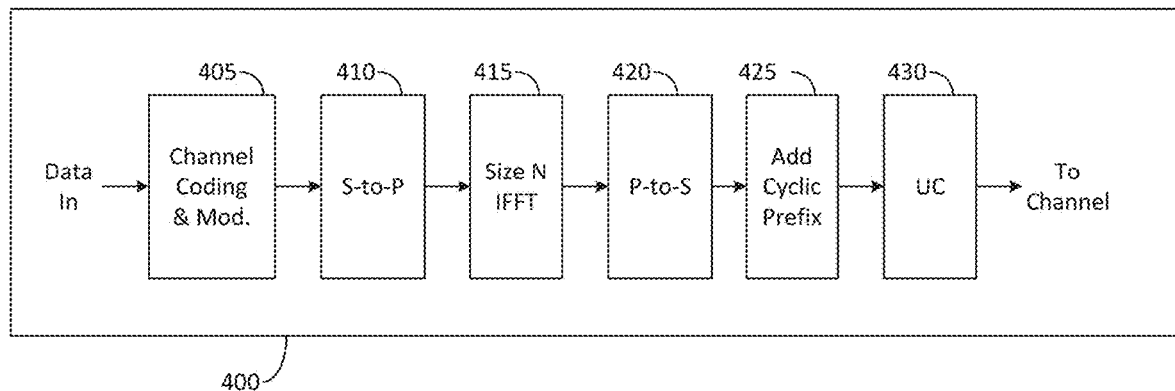
FIG. 4A illustrates a high-level diagram of an orthogonal frequency division multiple access transmit path according to embodiments of the present disclosure.
Figure 4B:
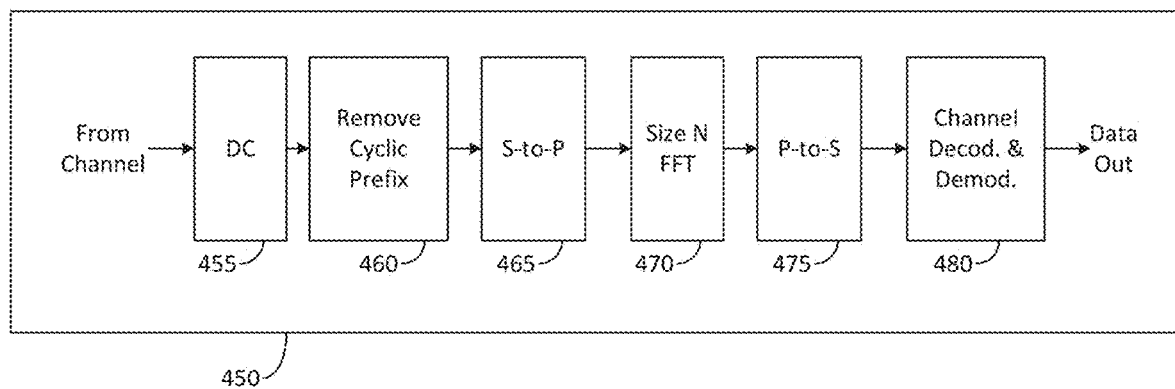
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
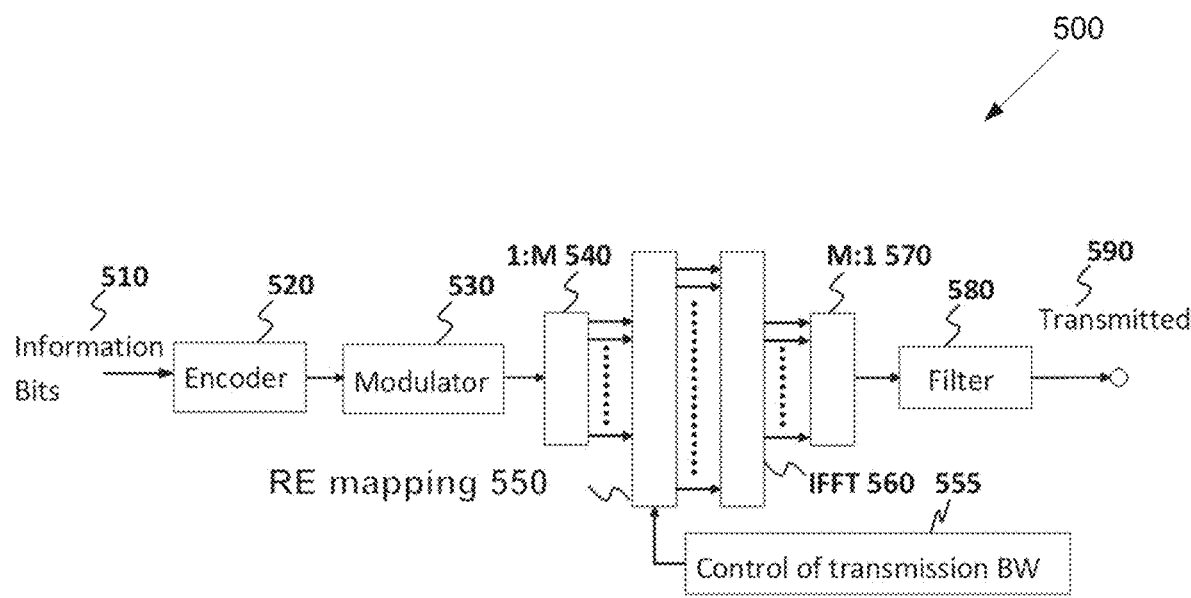
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
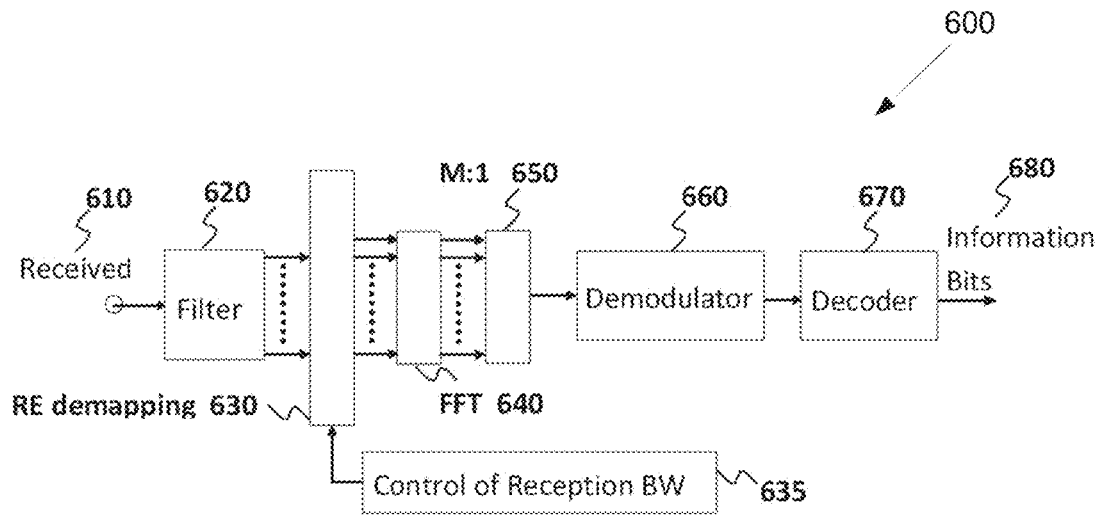
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
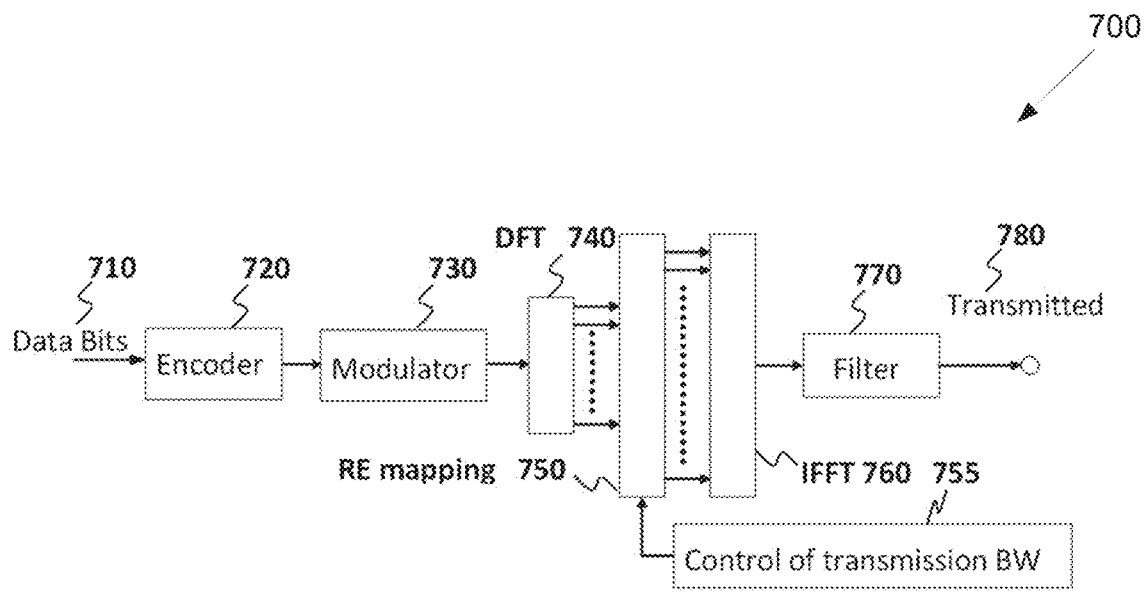
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
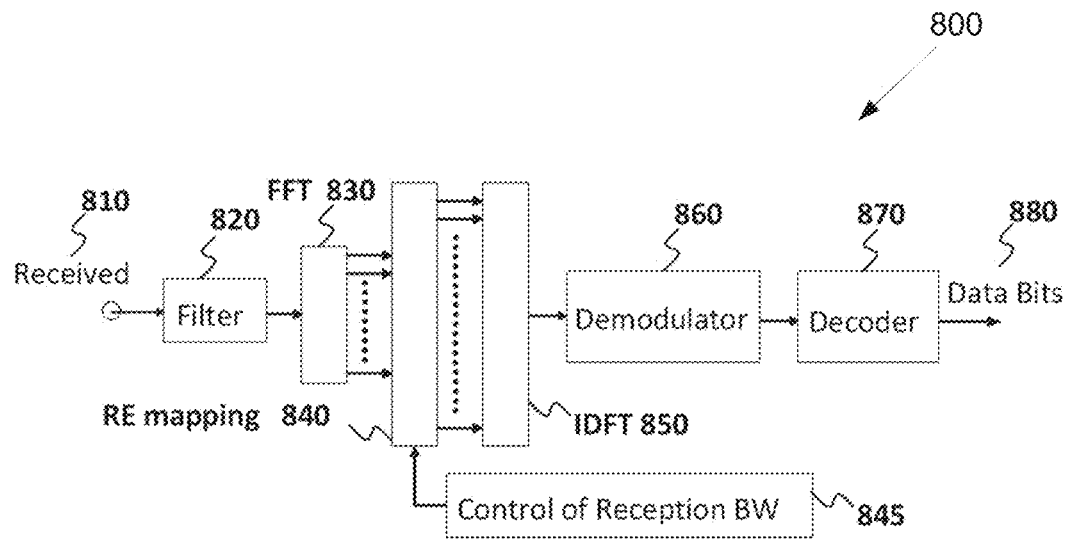
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP specification, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

The present disclosure discloses some embodiments for improving the interference management performance in CBRS and is free of aforementioned constraints. Before a CBSD receives or transmits in CBRS band (3.5-3.7 GHz), the CBSD may finish the following procedures: registration, spectrum inquiry (optional), grant. During a CBSD transmit or receive on CBRS band, the CBSD may maintain Heart Beat information with SAS.

Figure 9:
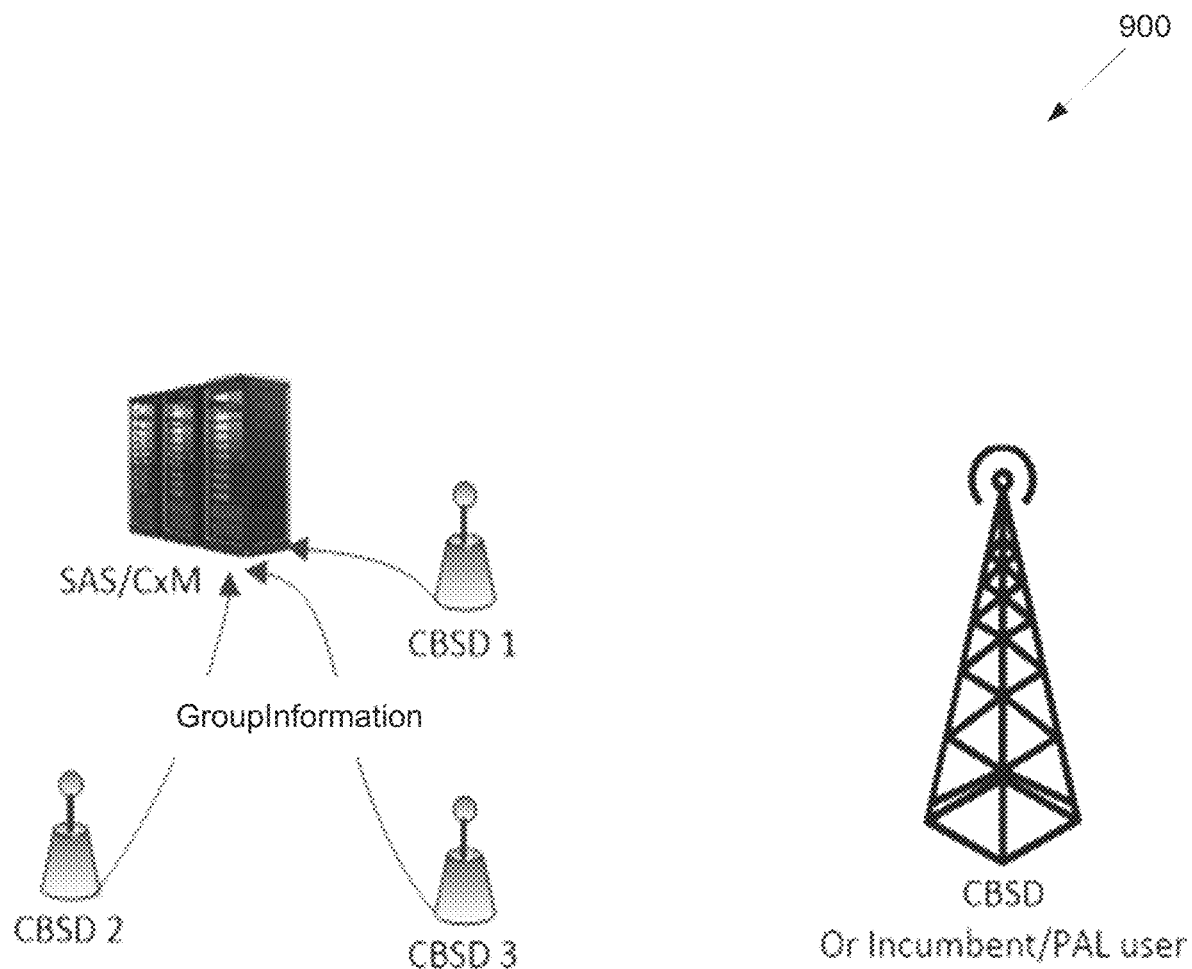
FIG. 9 illustrates general system architecture of CBSD-SAS system according to embodiments of the present disclosure.

FIG. 9 illustrates general system architecture of CBSD-SAS system 900 according to embodiments of the present disclosure. The embodiment of the general system architecture of CBSD-SAS system 900 illustrated in FIG. 9 is for illustration only. FIG. 9 does not limit the scope of this disclosure to any particular implementation.

As illustrated in FIG. 9, each CBSD may register to SAS and report measurement of each CBSD to SAS. SAS/CxM may allocate channel to each CBSD based on propagation model/measurement/incumbent report.

There are two phases of measurement processes. Phase I measurement process is the measurement CBSD process before a CBSD gets spectrum grant from SAS. Phase II measurement process is the measurement process after a CBSD get grant from SAS.

In one embodiment, a new measurement of RSRP/RSRQ is provided in CBRS system and the corresponding CBSD-SAS protocols are revised to adapt to this change. In one embodiment, a new measurement data fusion method is provided to integrate different measurements from different UEs, different measurements from the same UEs. In one embodiment, new methods for bandwidth expansion in CBRS systems based on measurement is provided.

The current design of CBRS system cannot distinguish the source of interference. With the present disclosure, new measurement data may be sent to SAS to improve the performance of coexistence and interference management. With the present disclose, new measurement data fusion methods are designed to integrate measurement data from different measurement entities. With the present disclosure, a new bandwidth expansion method is designed to improve the performance of bandwidth expansion.

Embodiment 1 Phase I Measurement Process in CBRS

In one embodiment, the cell reports the cell's time-stamped queue length (aggregated and on a per-user basis) and the duration of time over which the measurement took place. The measurement epoch duration and the queue length reporting times per cell could be configured either locally or via a SAS/CxM.

In a variant of the above embodiment, the cell could report a time-stamped queue length initially and subsequently report the (time-stamped) change in queue length and measurement duration. The reporting could consist of one time-stamped measurement per report or an aggregated set of time-stamped measurement reports. For each report, the cell also reports a unique identifier (e.g. E-UTRA Cell Global Identity/Cell ID etc.).

The report could also include other measurement quantities such as the buffer occupancy within the last measured epoch (defined as the portion of time that the queue-length at the cell is non-empty relative to the measurement epoch duration), average block error rate (both aggregated and on a per-user basis). In one embodiment, the data is reported to SAS/CxM without any quantization. In another embodiment, the data measured is quantized to N levels and $\log_2(N)$ bits are used to indicate the measurement data to SAS/CXM.

In some embodiments, reference signal received power (RSRP), and/or reference signal received quality (RSRQ), and/or received signal strength indicator (RSSI), and/or physical cell ID (PID), and/or global cell ID are measured during phase I measurement process. If RSRP and/or RSSQ are reported to SAS, the corresponding PID and/or global cell ID may also be reported to SAS. A timestamp attached to the measurement is reported to SAS.

In one embodiment, network listen mode (NLM) or radio environment measurement (REM) is implemented in the CBSD, the RSRP and/or RSRQ and/or RSSI and/or PID and/or global cell ID are measured during NLM or REM by CBSD DL receiver after a CBSD is powered on. The measurement data is sent to SAS/CxM through SAS-CBSD protocol.

In one embodiment, a new field, named "GroupInformation," is added in the current CBSD-SS protocol to transmit the measurement data to SAS/CxM. The "GroupInformation," which contains the measurement data, can be added in registration request message and/or grant request message and/or spectrum inquiry request message. Inside the GroupInformation field, a new object may be introduced to carrier the possible RSRP/RSRQ measurement data, for example, eutraCarrierRsrpRpt.

Inside the eutraCarrierRsrpRpt field, the measurement frequency, measurement bandwidth, measurement result, physical cell ID and/or global cell ID may be included. For example, the following revision as shown in TABLE 1 and TABLE 2 can be considered to be added in the current CBSD-SAS protocol.

TABLE 1 eutraCarrierRsrpRpt object in the GroupInformation field

| Parameters | R/O/C | Description |
| --- | --- | --- |
| NAME: measFrequency DATA TYPE: number | Required | Frequency of the lowest end of the measured channel |
| NAME: measbandwidth DATA TYPE: number | Required | Measurement bandwidth |
| NAME: measCarrierRsrpRpt DATA TYPE: array of object | Required | Measurement RSRP with cell ID and Global cell ID |

TABLE 2 measCarrierRsrpRpt object in the GroupInformation field

| Parameters | R/O/C | Description |
| --- | --- | --- |
| NAME: measRSRP DATA TYPE: number | Required | Frequency of the lowest end of the measured channel |
| NAME: meascellID DATA TYPE: number | Required | Physical cell ID |
| NAME: measGlobalcellID DATA TYPE: number | Required | Global cell ID |

Additionally, a CBSD may need to inform what kind of measurement capabilities it has by using "GroupInformation" in this "GroupInformation." Possible measurement capabilities include measurement of co-channel RSRP/RSRQ, inter-frequency channel RSRP/RSRQ etc. Emulation of measurement capabilities may be added in the GroupInformation of registration request message and/or grant request message and/or spectrum inquiry request message.

Figure 10A:
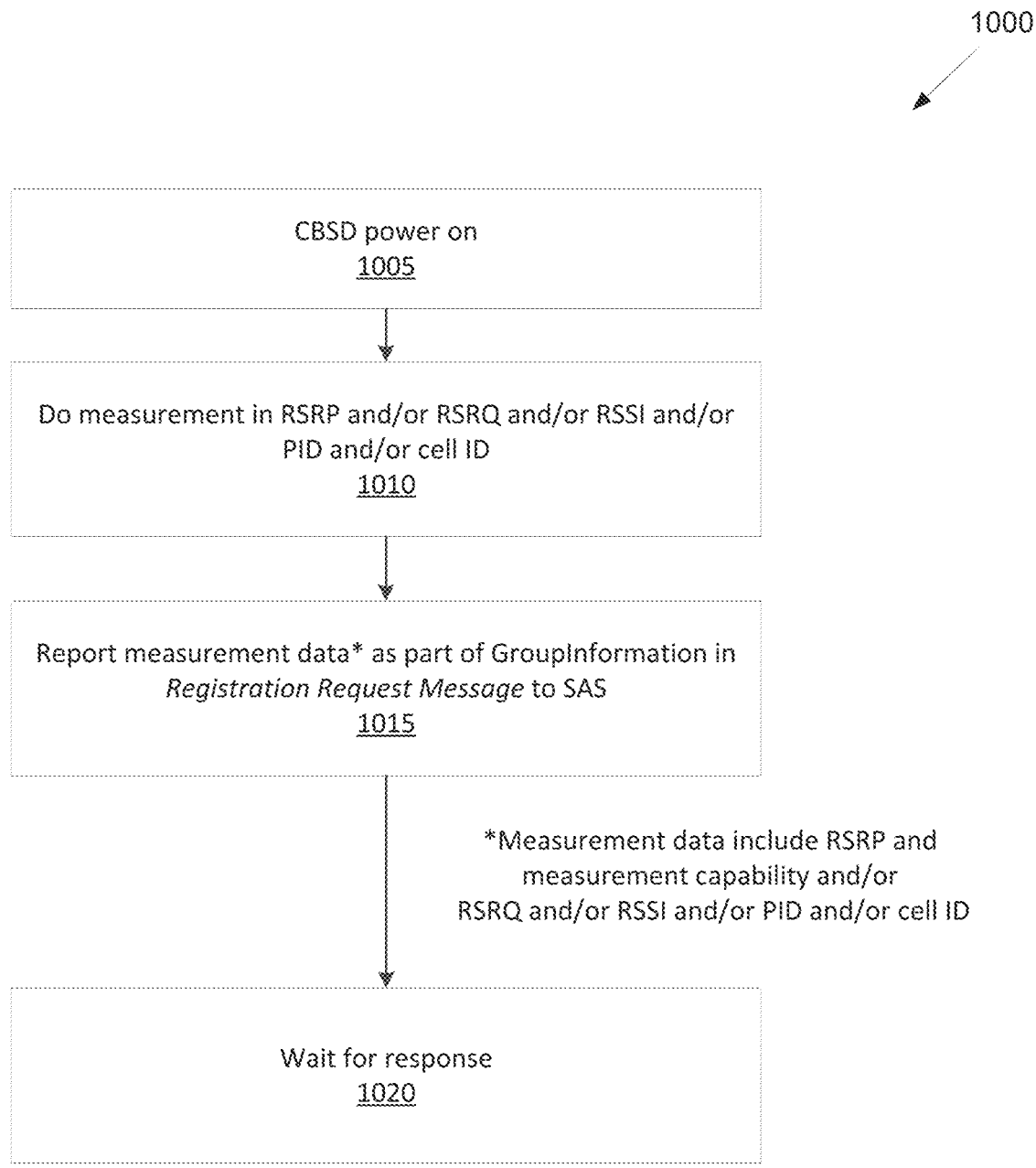
FIG. 10A illustrates a flowchart of a method for SAS/CxM procedures for Phase I measurement according to embodiments of the present disclosure.

FIG. 10A illustrates a flowchart of a method 1000 for SAS/CxM procedures for Phase I measurement according to embodiments of the present disclosure, as may be performed by CBSD. The embodiment of the method 1000 illustrated in FIG. 10A is for illustration only. FIG. 10A does not limit the scope of this disclosure to any particular implementation. The aforementioned procedures of a CBSD for Phase I measurement is illustrated in FIG. 10A.

As illustrated FIG. 10A, at step 1005, the CBSR turn power on. At step 1010, the CBSD perform measurement in RSRP and/or RSRQ. At step 1015, the measurement date is reported, by the CBSD to SAS, as part of GroupInformation in registration request message. At step 1020, a response is transmitted.

Figure 10B:
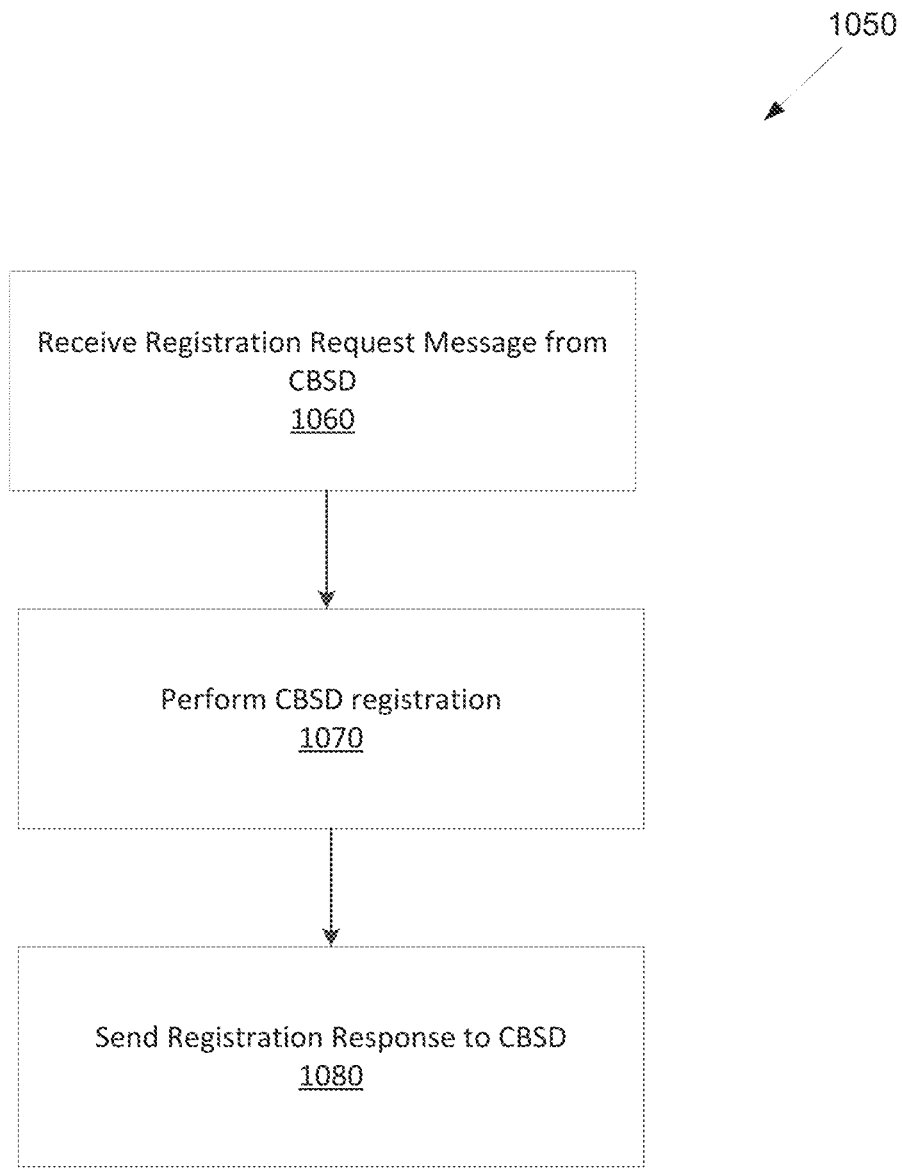
FIG. 10B illustrates a flowchart of a method for SAS procedures Phase I measurement according to embodiments of the present disclosure.

FIG. 10B illustrates a flowchart of a method 1050 for SAS procedures Phase I measurement according to embodiments of the present disclosure, as may be performed by an entity. The embodiment of the method 1050 illustrated in FIG. 10B is for illustration only. FIG. 10B does not limit the scope of this disclosure to any particular implementation. The aforementioned procedures of a SAS/CxM for Phase I measurement is illustrated in FIG. 10B.

As illustrated in FIG. 10B, the entity receives registration request message from CBSD at step 1060. At 1070, the entity performs CBSD registration. The entity, at step 1080, sends registration response to the CBSD.

Figure 11A:
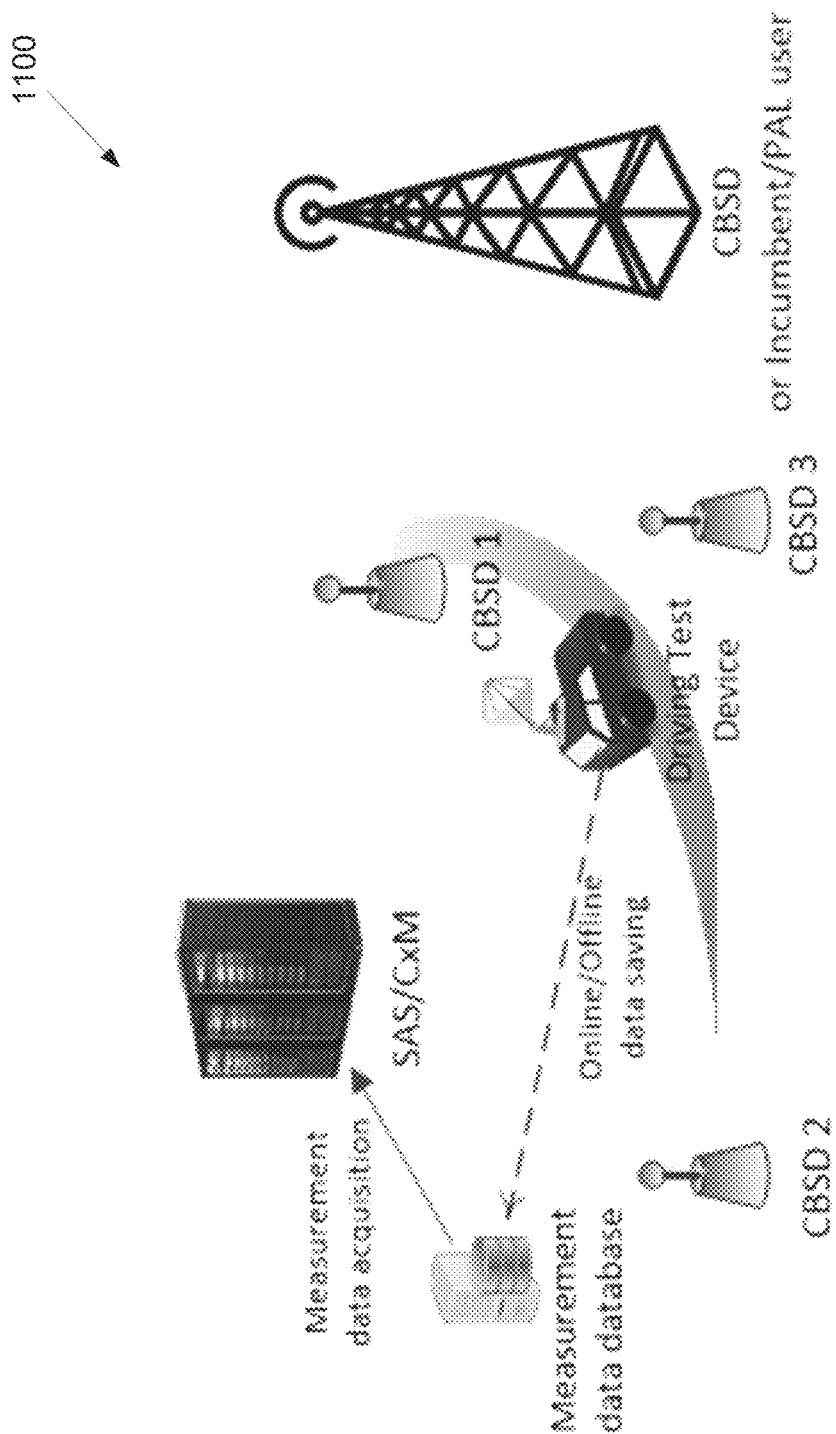
FIG. 11A illustrates a driving test based measurement according to embodiments of the present disclosure.

FIG. 11A illustrates a driving test based measurement 1100 according to embodiments of the present disclosure. The embodiment of the driving test based measurement 1100 illustrated in FIG. 11A is for illustration only. FIG. 11A does not limit the scope of this disclosure to any particular implementation.

In one embodiment, a driving test is conducted by a CBSD or an extra device or certified professional installer. The measurement data including RSRP and/or RSRQ and/or RSSI and/or PID and/or global cell ID and/or timestamp are stored in an independent database. A CBSD may fetch the measurement data from database and send the measurement data to SAS/CxM. Alternatively, a CBSD may indicate SAS whether the measurement data is available at CBSD or available at a separate database.

Figure 11B:
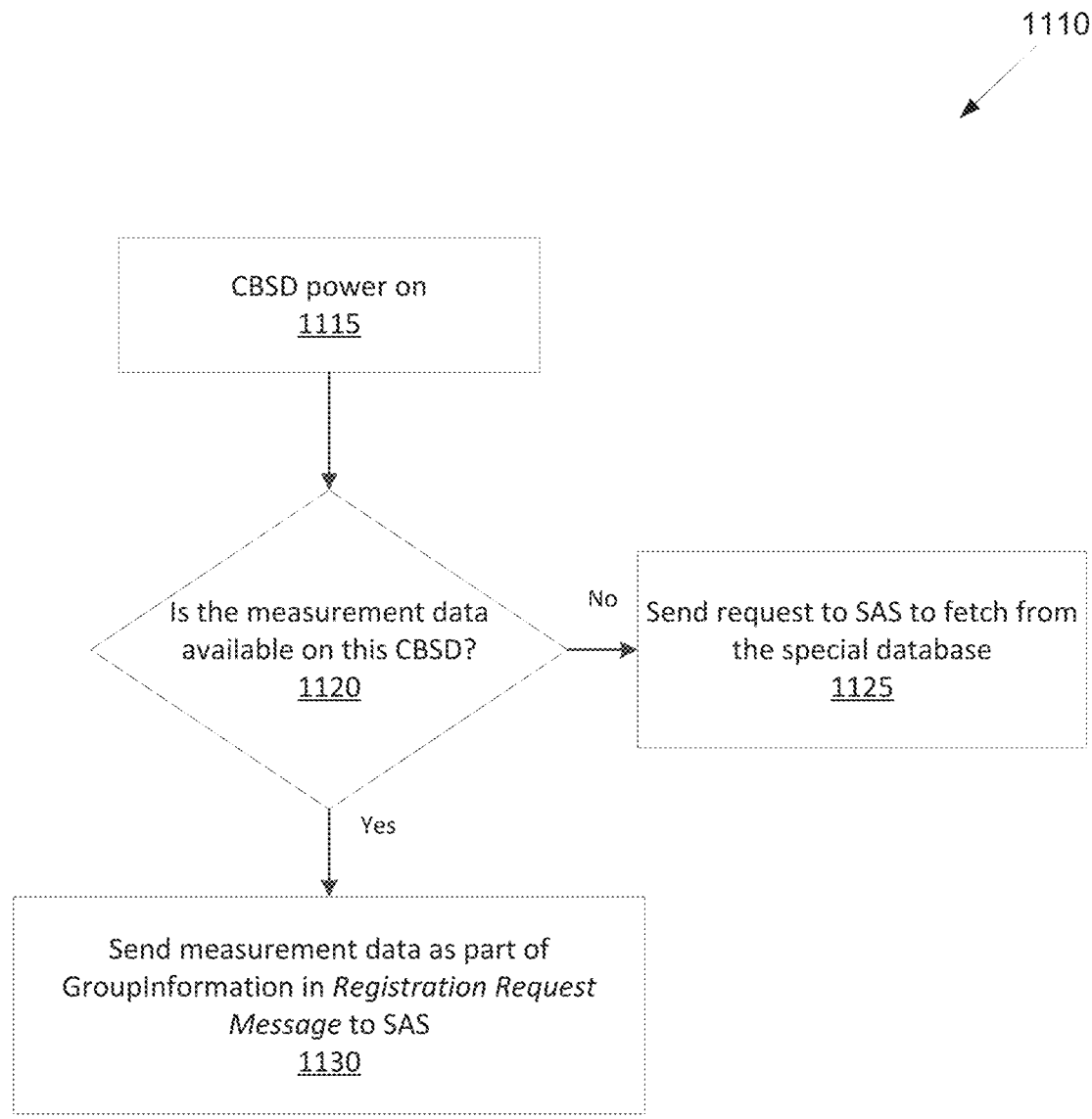
FIG. 11B illustrates a flow chart of a method for CBSD procedures in a driving test scenario according to embodiments of the present disclosure.

FIG. 11B illustrates a flow chart of a method 1110 for CBSD procedures in a driving test scenario according to embodiments of the present disclosure, as may be performed by CBSD. The embodiment of the method 1110 illustrated in FIG. 11B is for illustration only. FIG. 11B does not limit the scope of this disclosure to any particular implementation.

As illustrated in FIG. 11B, the CBSD turn power on at step 1115. At step 1120, the CBSD determine whether the measurement data is available on the CBSD. At step 1125, the CBSD sends a request to SAS to fetch from the special database if the measurement data is not available. If the measurement data is available, at step 1130, the CBSD sends measurement data as part of GoupInformation in registration request message to SAS.

If the measurement data is available at a separate database, the CBSD may indicate SAS where its measurement data is. The SAS/CxM can fetch the measurement data directly from the database with or without the indication from CBSD. The related CBSD procedures is illustrated in FIG. 11B. The related SAS/CxM procedure is illustrated in FIG. 11C.

Figure 11C:
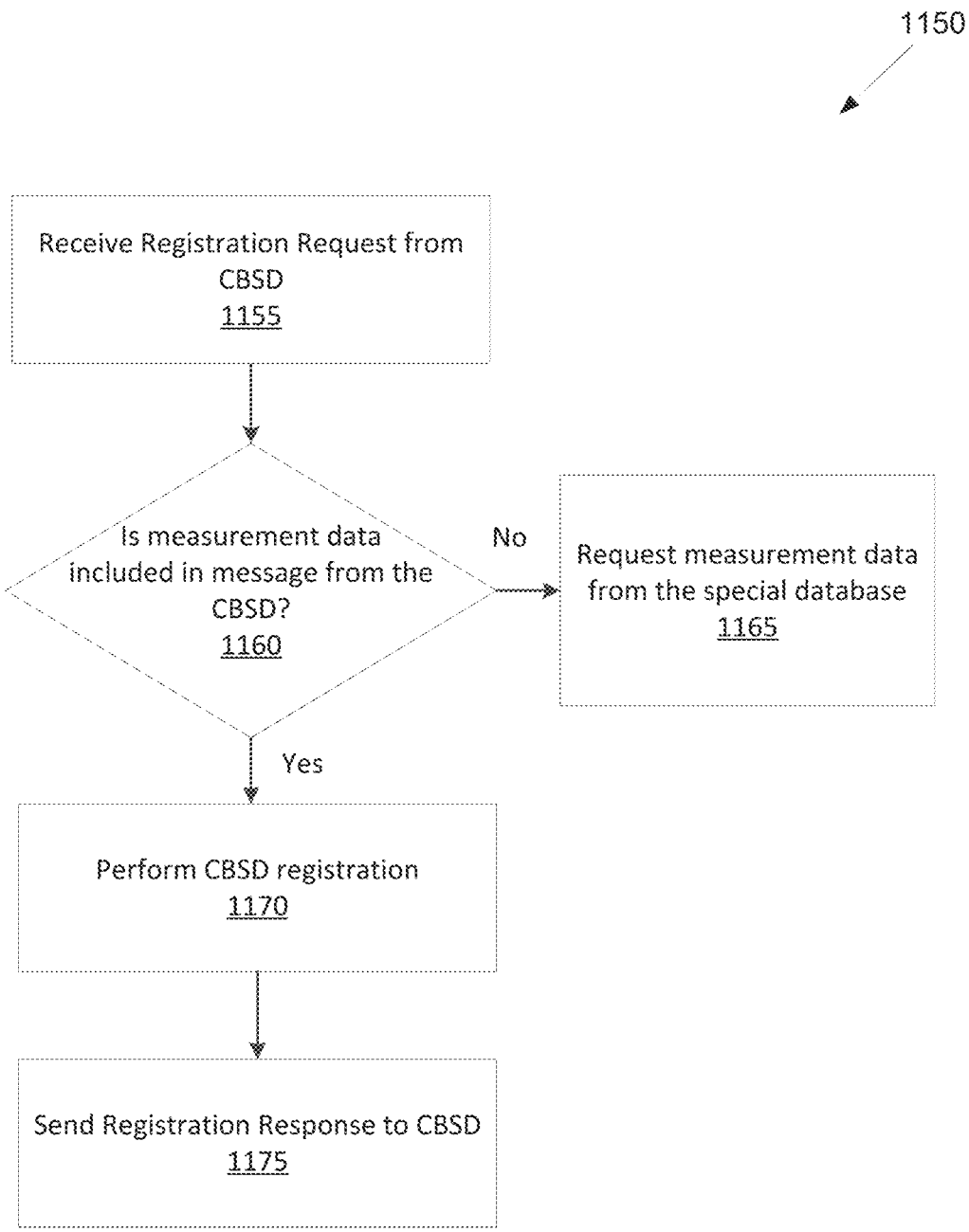
FIG. 11C illustrates a flow chart of a method for SAS/CxM procedures in a driving test scenario according to embodiments of the present disclosure.

FIG. 11C illustrates a flow chart of a method 1150 for SAS/CxM procedures in a driving test scenario according to embodiments of the present disclosure, as may be performed by an entity (e.g., SAS/CxM). The embodiment of the method 1150 illustrated in FIG. 11C is for illustration only. FIG. 11C does not limit the scope of this disclosure to any particular implementation.

As illustrated in FIG. 11C, the entity (e.g., SAS/CxM) receives, at step 1155, registration request from CBSD. At step 1160, the entity determines whether measurement data is included in a message from the CBSD. If the message is not included, the entity request measurement data from the special database at step 1165. At step 1170, the entity performs CBSD registration if the measurement data is included in message from the CBSD. At step 1175, the entity sends a registration response to the CBSD.

Embodiment 2 Phase II Measurement Process in CBRS

For some embodiment of this disclosure, RSRP and/or RSRQ and/or RSSI and/or PID and/or global cell ID and/or queue length and/or traffic priority and/or spectrum access priority are measured during phase II measurement process. These measurements as well as a timestamp of the measurement may be reported to SAS after a CBSD receiving spectrum grant from SAS. The phase II measurement can be either triggered by SAS/CxM or configured by SAS/CxM periodically. The phase II measurement can be conducted either by CBSD or by the attached UEs to the CBSD or both.

Figure 12:
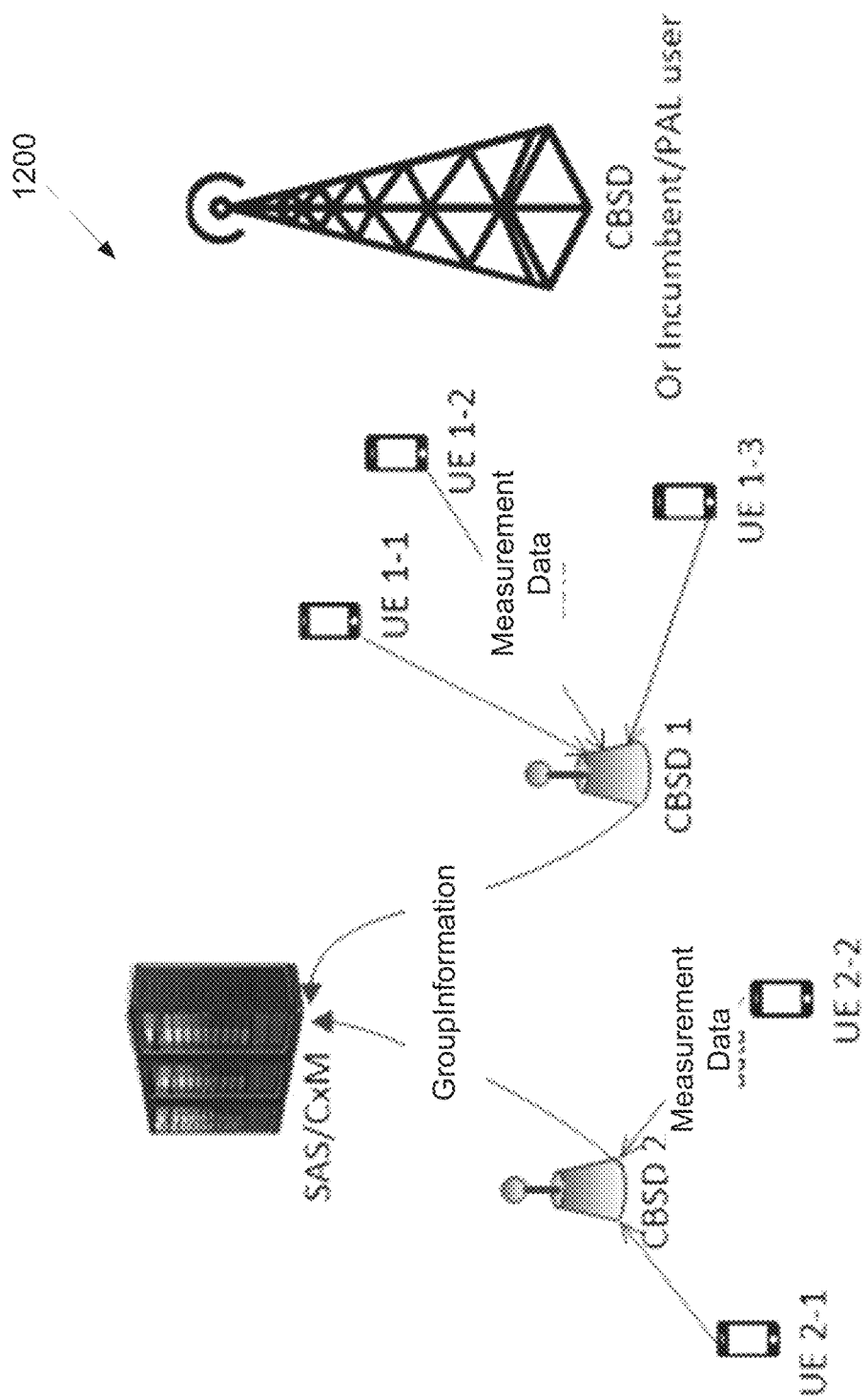
FIG. 12 illustrates a measurement data collection from CBSD attached UEs according to embodiments of the present disclosure.

FIG. 12 illustrates a measurement data collection 1200 from CBSD attached UEs according to embodiments of the present disclosure. The embodiment of the measurement data collection 1200 illustrated in FIG. 12 is for illustration only. FIG. 12 does not limit the scope of this disclosure to any particular implementation.

In one embodiment, the phase II measurement data is collected by a CBSD from attached UEs. The measurement data (including RSRP and/or RSRQ and/or RSSI and/or PID and/or global cell ID) is collected from UEs as shown in FIG. 12.

In another embodiment, UEs attached to a CBSD may report their measurements to SAS/CxM directly.

In yet another embodiment, CBSD may collect measurement results by DL receivers using NLM or REM.

In one embodiment, phase II measurement is triggered by SAS/CxM. In case a SAS/CBSD wants some new measurement from a CBSD, a new field, named GroupInformation, may be configured in the heart response message or grant response message. In the GroupInformation field, the measurement instructions on measurement metric, measurement periodicity are conveyed from SAS to CBSD. For example, "CoexmeasReportConfig" can be added in the GroupInformation to indicate what kind of measurements (RSRP or RSRQ or etc.) may be reported to SAS.

Possible enumerations of "CoexmeasReportConfig" includes: "EUTRA_CARRIER_RSRP_NON_TX" indicating CBSD do RSRP measurement w/o spectrum grant; "EUTRA_CARRIER_RSRP_ALWAYS" indicating a CBSD do RSRP measurement w/or w/o spectrum grant. Additional permitted enumerations may include "EUTRA_CARRIER_RSRQ_NON_TX" indicating a CBSD may collect/conduct RSRQ measurement w/o grant, and/or "EUTRA_CARRIER_RSRQ_ALWAYS" indicating a CBSD may collect/conduct RSRQ measurement w/or w/o grant, and/or "EUTRA_CARRIER_RSRP_RSRQ_NON_TX" indicating a CBSD may collect/conduct both RSRP and RSRQ measurement w/o grant, and/or "EUTRA_CARRIER_RSRP_RSRQ ALWAYS" indicating a CBSD may conduct/collect both RSRP and RSRQ measurement w/or w/o grant.

TABLE 3 shows related changes in the CBSD-SAS protocol as an example of this method.

In one example, the "EUTRA_CARRIER_RSRP_NON_TX" can indicate a CBSD to do both co-channel and inter frequency channel measurement; the "EUTRA_CARRIER_RSRP_ALWAYS" can indicate a CBSD to do co-channel measurement.

In another embodiment, phase II measurement is triggered by CBSD periodically. The period is further configured by the SAS through "GroupInformation" in a grant response message or heartbeat response message. An additional field on the measurement periodicity configuration can be added to the "GroupInformation" in grant response message or heartbeat response message.

TABLE 3

Coexistence measurement in heartbeat/grant response message GroupInformation

| Parameters | R/O/C | Description |
| --- | --- | --- |
| CoexmeasReportConfig DATA TYPE: array of string | Optional | The SAS uses this parameter to configure CBSD coexistence measurement reporting. The measurement report requested by the SAS is RSRP. The CBSD may conduct RSRP measurement according to the following permitted enumerations: "EUTRA_CARRIER_RSRP_NON_TX", "EUTRA_CARRIER_RSRP_ALWAYS" |

Figure 13A:
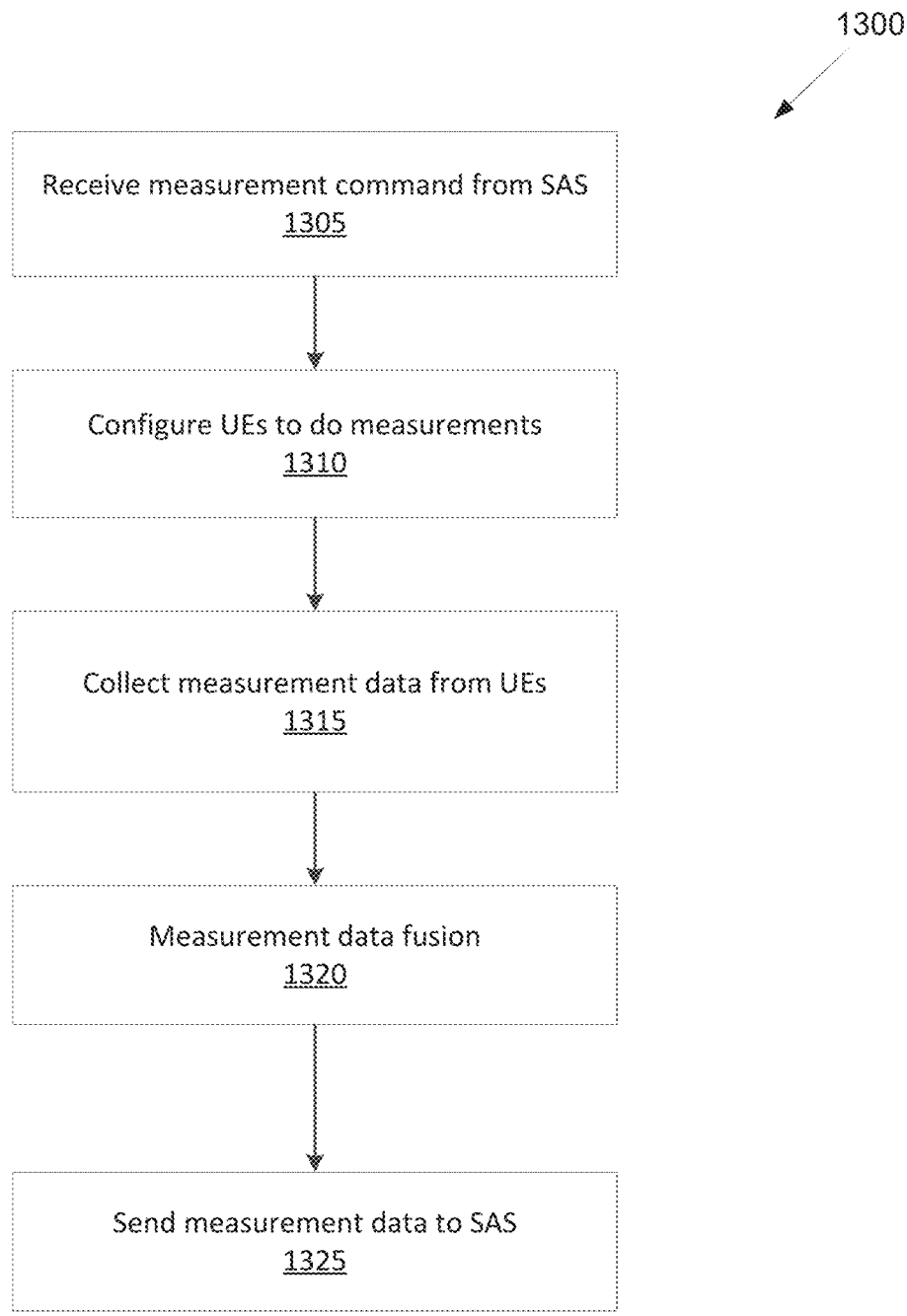
FIG. 13A illustrates a flow chart of a method for CBSD procedures in phase II measurement according to embodiments of the present disclosure.

FIG. 13A illustrates a flow chart of a method 1300 for CBSD procedures in phase II measurement according to embodiments of the present disclosure, as may be performed by CBSD. The embodiment of the method 1300 illustrated in FIG. 13A is for illustration only. FIG. 13A does not limit the scope of this disclosure to any particular implementation. The procedures for CBSD in phase II measurement is illustrated in FIG. 13A.

As illustrated in FIG. 13A, at step 1305, the CBSD receives measurement command from SAS. At step 1310, the CBSD configures UEs to perform measurement. The CBSD, at step 1315, collects measurement data from the UEs. The CBSD at step 1320 perform the measurement data fusion. The CBSD at step 1325 sends measurement data to the SAS.

Figure 13B:
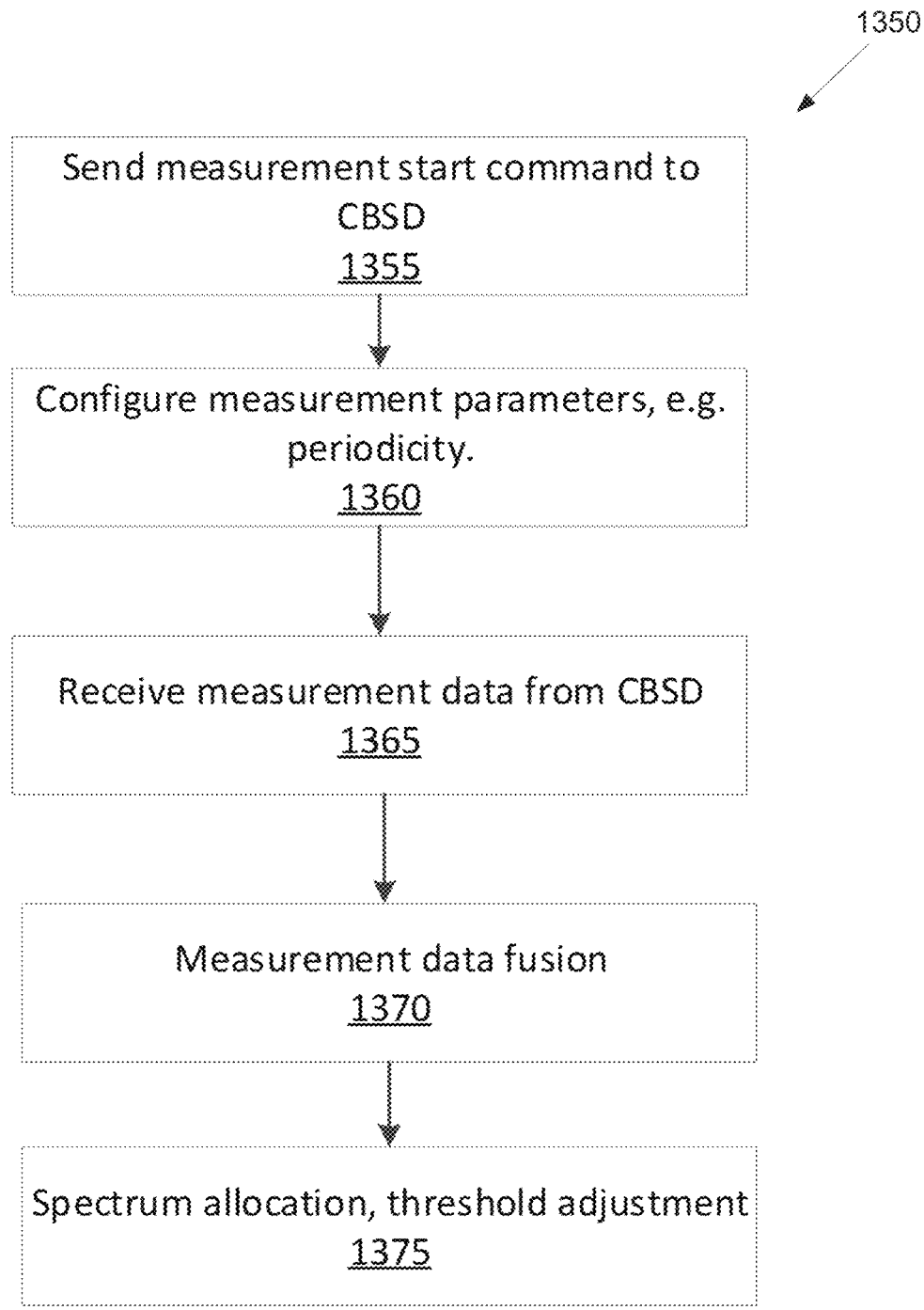
FIG. 13B illustrates a flow chart of a method for SAS/CxM procedures in phase II measurement according to embodiments of the present disclosure.

FIG. 13B illustrates a flow chart of a method 1350 for SAS/CxM procedures in phase II measurement according to embodiments of the present disclosure, as may be performed by an entity (e.g., SAS/CxM). The embodiment of the method 1350 illustrated in FIG. 13B is for illustration only. FIG. 13B does not limit the scope of this disclosure to any particular implementation.

The procedures for SAS/CxM in phase II measurement is illustrated in FIG. 13B.

As illustrated in FIG. 13B, the entity sends measurement start command to CBSD at step 1355. At step 1360, the entity configures measurement parameters, for example, periodicity. At step 1365, the entity receives measurement data from the CBSD. The entity performs measurement data fusion at step 1370. At 1375, the entity performs spectrum allocation and threshold adjustment.

Embodiment 3 Measurement Data Fusion from Different Measurement Entities

For some embodiments of the present disclosure, a data fusion mechanism is designed to integrate the measurement data from different measurement entities in a CBSD network. In one case, different measurement entities mean different UEs attached to the same CBSD. In another case, different measurement entities mean different CBSDs belong to the same CCG/ICG. A CBSD/CCG may report the measurement data from every UE/CBSD to the SAS and the SAS may integrate different measurement data from different UEs/CBSDs together.

Alternatively, a CBSD/CCG can do the measurement data fusion locally and report the integrated measurement data to the SAS. In one example, the measurement data can refer to RSRP, or RSRQ, or RSSI or different combinations of them. In another example, the measurement data may refer to the queue length, BLER and traffic priority. There are different cases for data fusion.

In one case, a measurement from different neighbor cells is reported from different UEs/CBSDs. In this case, the measurement data from different neighbor cells may be reported to the SAS/CxM. For example, a UE A reports a measurement data DATA_A for one neighbor cell and UE B report a measurement data DATA_B for another neighbor cell. The CBSD may report the final measurement of both DATA_A and DATA_B and the corresponding PID and/or global cell ID and/or timestamp to the SAS/CxM.

In another case, different measurements on the same neighbor cells are reported from different UEs/CBSDs. In this case, a function of the measurement data may be reported. For example, a UE A reports measurement data DATA_A from a neighbor cell while a UE B report a measurement data DATA_B from the same neighbor cell, while the measurement from a UE C may be DATA_C . . . The final fusion result is a function of the measurement data, i.e., DATA_Fusion=function(DATA_A, DATA_B, DATA_C, . . . ).

The function here can be an arithmetic average, i.e., DATA_Fusion=sum(DATA_A, DATA_B, DATA_C, . . . )/(Number of measurement); weighted average, i.e., DATA_Fusion=beta_A*DATA_A+beta_B*DATA_B+beta_C*DATA_C+ . . . ; or the maximum, i.e., DATA_Fusion=max(DATA_A, DATA_B, DATA_C, . . . ); or the minimum, i.e., DATA_Fusion=min(DATA_A, DATA_B, DATA_C, . . . ).

In yet another case, different measurements on the same neighbor cells are reported from the same UEs/CBSDs at different times. In this case, the fusion data can be the average of the measurement or the fusion data can be the latest measurement data.

In a real system, the measurement data fusion may happen in the sequence of (1) integrating measurement data on the same neighbor cells reported from the same UEs/CBSD; (2) integrating measurement data on the same neighbor cells from different UEs/CBSDs; and (3) integrating measurement data from different measurement entities on different neighbor cells.

Embodiment 4 Bandwidth Expansion Based on Measurement

In this embodiment of the present disclosure, measurement data is used for bandwidth expansion of a wireless system. A CBSD can do bandwidth expansion based on the traffic load, interference and incumbent protection etc. Measurement data from co-existence can be reused for bandwidth expansion purpose.

In one embodiment, the channel on which a CBSD can expand is decided by SAS. After a CBSD receives spectrum inquiry response message from the SAS, a CBSD may get several candidate channels to work on. After a CBSD receives grant response message from the SAS, a CBSD may get one primary channel out of several candidate channels. Additionally, the SAS may configure one of the left over candidate channels as a bandwidth expansion channel or secondary channel or a CBSD.

In another embodiment, an additional grant request message may be sent from a CBSD to request a channel for bandwidth expansion. A new field, named "GroupInformation", may be added in the grant request message. In the GroupInformation, a new object for expansion bandwidth may be defined for a CBSD to apply additional bandwidth from the SAS. A new field, named "GroupInformation", may be added to Grant Response Message. In the GroupInformation, a new object "expansionParam" may be defined to indicate the CBSD its band for expansion.

Figure 14:
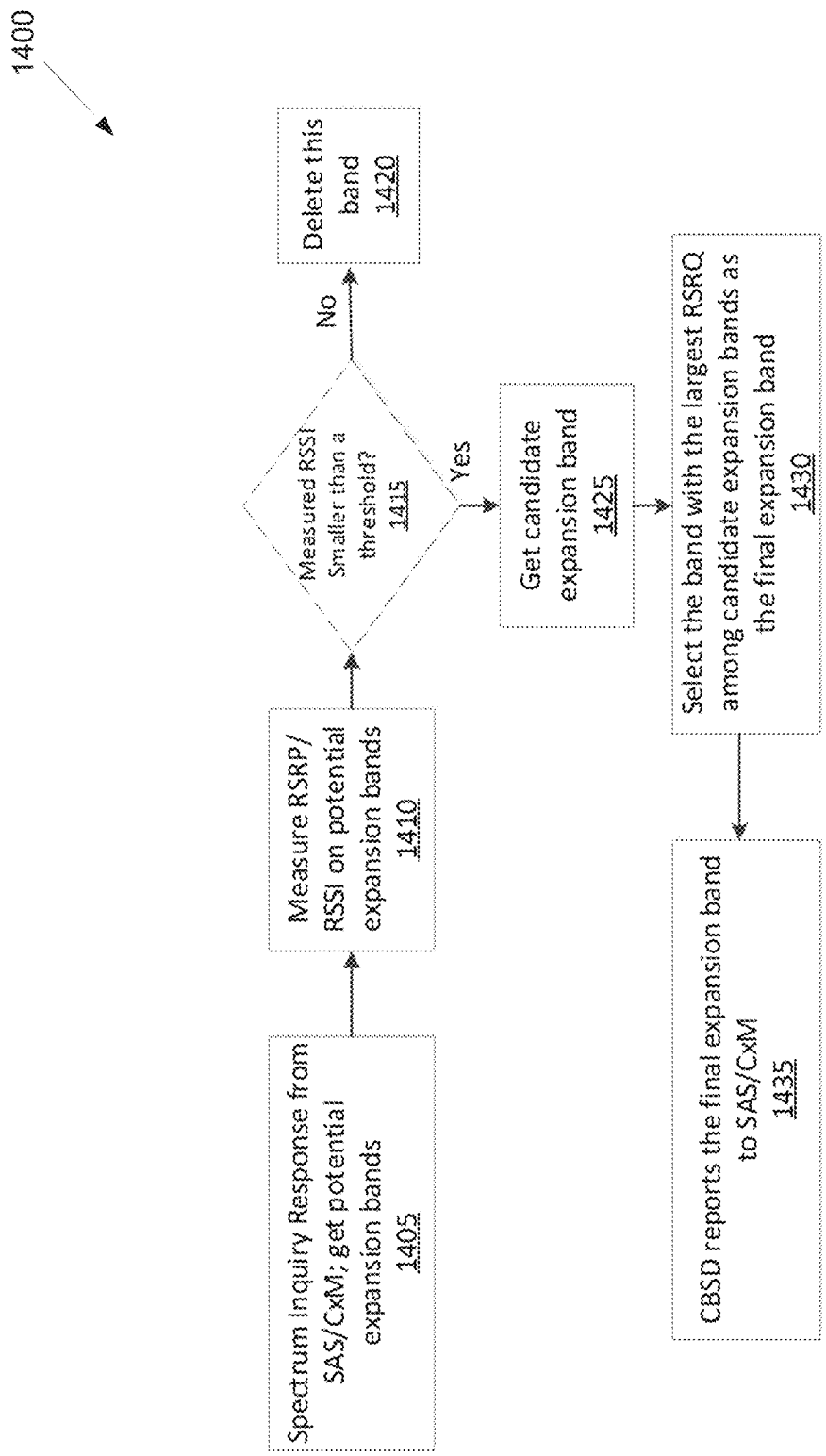
FIG. 14 illustrates a measurement based band expansion according to embodiments of the present disclosure.

FIG. 14 illustrates a measurement 1400 based band expansion according to embodiments of the present disclosure, as may be performed by CBSD. The embodiment of the measurement 1400 illustrated in FIG. 14 is for illustration only. FIG. 14 does not limit the scope of this disclosure to any particular implementation.

As illustrated in FIG. 14, the CBSD at step 1405 receives spectrum inquiry response from SAS/CxM and get potential expands bands. At step 1410, the CBSD measures RSRP/RSSI on potential expansion bands. The CBSD determines whether the measured RSSI is smaller than a threshold at step 1415. At step 1420 the CBSD deletes the band if the measured RSSI is not smaller than the threshold. As step 1425, the CBSD gets candidate expansion band. At step

1430, the CBSD selects the band with the largest RSRQ among candidate expansion bands as the final expansion band. The CBSD reports, at step 1435, the final expansion band to SAS/CxM.

In yet another embodiment, a CBSD may decide several bands from spectrum inquiry response message as potential expansion bands. The CBSD may measure the RSRP/RSSI on the potential expansion bands. After measurement, the potential expansion bands with RSSI smaller than a threshold are considered as candidate expansion bands.

Within candidate expansion bands, a CBSD may select the expansion band with the largest RSRQ or $N_{prb}$*RSRP/RSSI in case RSRQ is not available, where $N_{prb}$ means the number of PRBs for RSSI. The CBSD may report its expansion band back to the SAS/CxM so that the SAS/CxM can update their database on the usage of expansion bands. The SAS/CxM may take this into account while assigning candidate expansion band subsequently. Procedures on band expansion are illustrated in FIG. 14.

Embodiment 5 RRM Adaptation Based on Measurement

In one embodiment of the present disclosure, measurement data is used to decide whether a CBSD may modify either or both of the energy detection thresholds and downlink transmission powers. For example, if the measurement data indicates that the queue length of a neighbor PAL has increased, the CBSD can lower its energy detection threshold or downlink transmit power or both in order to minimize its downlink interference. The configuration of the energy detection threshold/downlink transmission powers may be done locally at the CBSD or configured via the SAS.

Embodiment 6 Measurements to Further Improve the Coordination Among CBSD Nodes

In some embodiments of the present disclosure, measurements from CBSDs or UEs are used to improve the coordination of CBRS networks. These measurements can include part of or a combination of the following metrics: (1) user perceived throughputs calculated as the total downlink served data (between a start time and an end time) at the CBSD divided by the actual time for transmission of the data; (2) user perceived throughputs on one or more subframe(s), where each throughput is calculated as the served data on that subframe divided by the duration of the subframe (1 ms); (3) a buffer occupancy report calculated as the fraction of time, or alternatively the number of subframes/slots during which the transmission queue at the CBSD in non-empty within a time-interval corresponding to a pre-specified start time and end-time; (4) type of traffic and percentage of resource used in a certain interval of time (one example may be best effort 20%, delay-sensitive: 80%); (5) Tx/Rx MCS within a period of a time; (6) bit error rate within a period of a time; (7) frame error rate within a period of a time; (8) user plane delay and latency.

After receiving these measurement data, SAS/CXM may adjust the network parameter accordingly to improve the network performance. The network adjustment actions for example reduce the Tx power, increase the Tx power etc. may be sent through GroupInformation in HelloResponseMessage.

In one embodiment, these measurements are conducted at CBSD/UE after receiving trigger information from SAS/CxM, for example, the trigger information can be the GroupInformation in HelloMessage.

In another embodiment, these measurements are conducted periodically at CBSD/UE where the periodicity can be configured by SAS/CxM through the GroupInformation in HelloMessage.

In one embodiment, these raw measurements may be reported to SAS/CxM.

In another embodiment, statics of these measurements, for example, the distribution or the average value within the measurement period may be reported to SAS/CXM.

The newly emerging technologies, such as mobile multimedia transmission, require a high throughput for deliver the multimedia content. However, radio spectrum is a scarce resource. To mitigate the demand for spectrum, spectrum sharing can be employed to improve spectrum utilization.

In the conventional spectrum management framework, spectrum access licenses for different radio bands are issued by the regulators (such as the FCC in the US) to operators providing services with the licensed bands. In the context of our disclosure, the spectrum operators granted with the licenses are called the primary users (PUs). Traditionally, the spectrum band resource can only be exclusively used by the PU. However, with our spectrum sharing scheme, spectrum users without a license can also access the spectrum band when the band is not occupied by the PU. The spectrum users without a license accessing the spectrum band are called the secondary users (SUs).

An aspect of spectrum sharing is that the activities of the SU may not cause intolerable interference to the PU. To this end, SUs needs to detect whether a PU is occupying the band before the SUs can use the band. The scheme, in which SUs detect PUs' activity for the opportunistic use of the spectrum, is referred to as listen-before-talk (LBT).

CBRS network is one example of spectrum sharing system. FCC decided on April, 2015 to establish a new CBRS for shared wireless broadband use of the 3550-3700 MHz band (3.5 GHz Band). Sharing the CBRS band may first guarantee no interference to the incumbent radar systems. Second, flexible wireless broadband use is the basic rule of utilizing the CBRS band. Finally, for supporting innovation and growth throughput, CBRS band is expected to be deployed in industrial applications—advanced manufacturing, energy, healthcare, etc.

LTE-TDD according to 3GPP specification been adopted as the frame structure for CBRS. In a CBRS network, two entities SAS and CxM are responsible for the spectrum allocation and the interference control such that the different operators can utilize CBRS band fair and effectively. The spectrum allocation is performed at a fixed period, that is, CBSDs are able to use the allocated band for several weeks once channel access permission is allowed. The week-wise spectrum allocation cannot achieve efficient utilization of the CBRS band.

The present disclosure presents an LBT scheme which is designed to allow SUs to coexist with PUs. The SUs perform opportunistic transmission on the PUs' band. The transmission duration is in the order of milliseconds. For efficient spectrum sharing, the subframe boundary of the SUs may be aligned with that of the PUs.

An LBT is a new technology to improve the spectrum utilization efficiency in shared spectrum systems, such as CBRS systems, MulteFire, and 5G. With the present disclosure, SUs can utilize the millisecond-level holes of the PUs' spectrum use, which improves spectrum utilization. The boundaries of SUs' transmission period are aligned with the subframe boundary of PU. The invented scheme can work in two modes: there is an extra licensed channel assists conveying the control signal for SU. In the other mode, the SUs can work without extra licensed channel assistance.

In an LBT scheme, before transmitting on a channel, an eNB or a UE may detect whether the channel is idle or not. If the channel is sensed to be idle, the transmitter is allowed to transmit a signal on the channel. If the carrier is sensed to be occupied, the transmitter may wait for the next sensing window.

For easy illustration purpose, the following description shows an example of applying the present disclosure in TDD systems. It is worth noting that the present disclosure can also be applied in FDD system, or new systems defined in 5G NR.

Figure 15A:
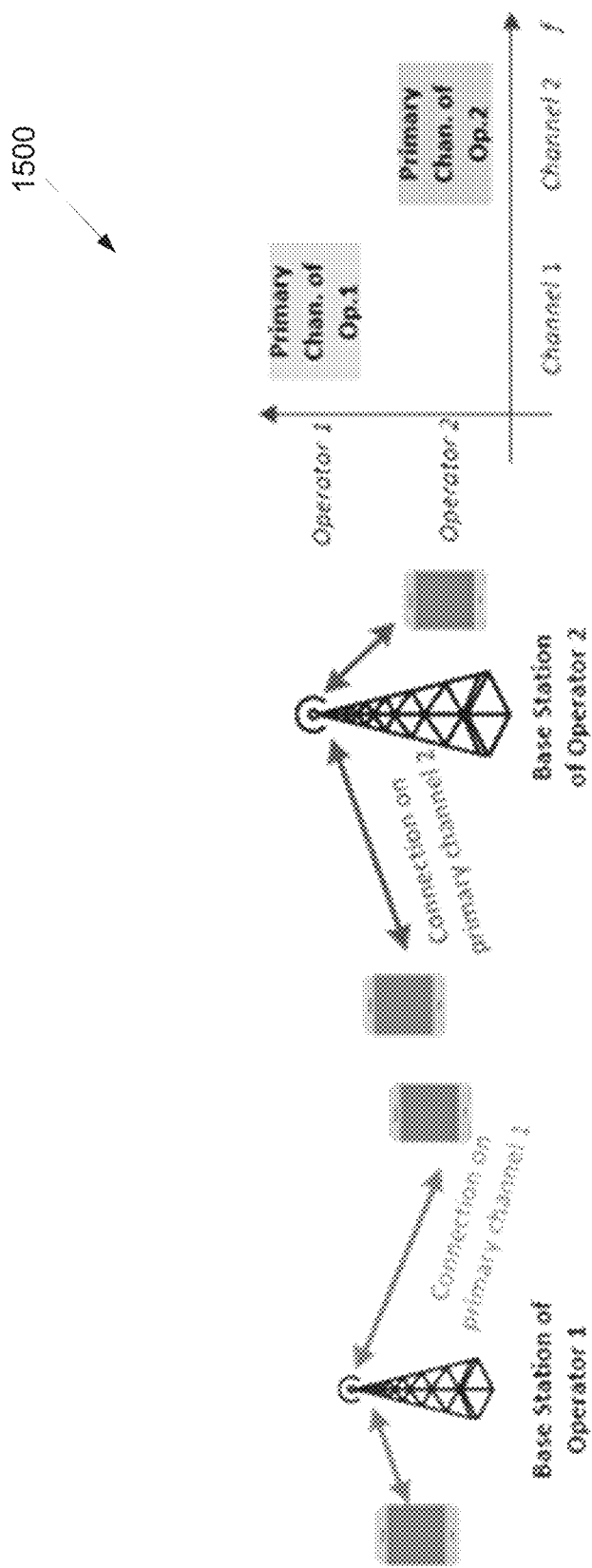
FIG. 15A illustrates a standalone TDD configuration on orthogonal channels according to embodiments of the present disclosure.

FIG. 15A illustrates a standalone TDD configuration 1500 on orthogonal channels according to embodiments of the present disclosure. The embodiment of the standalone TDD configuration 1500 illustrated in FIG. 15A is for illustration only. FIG. 15A does not limit the scope of this disclosure to any particular implementation.

Figure 15B:
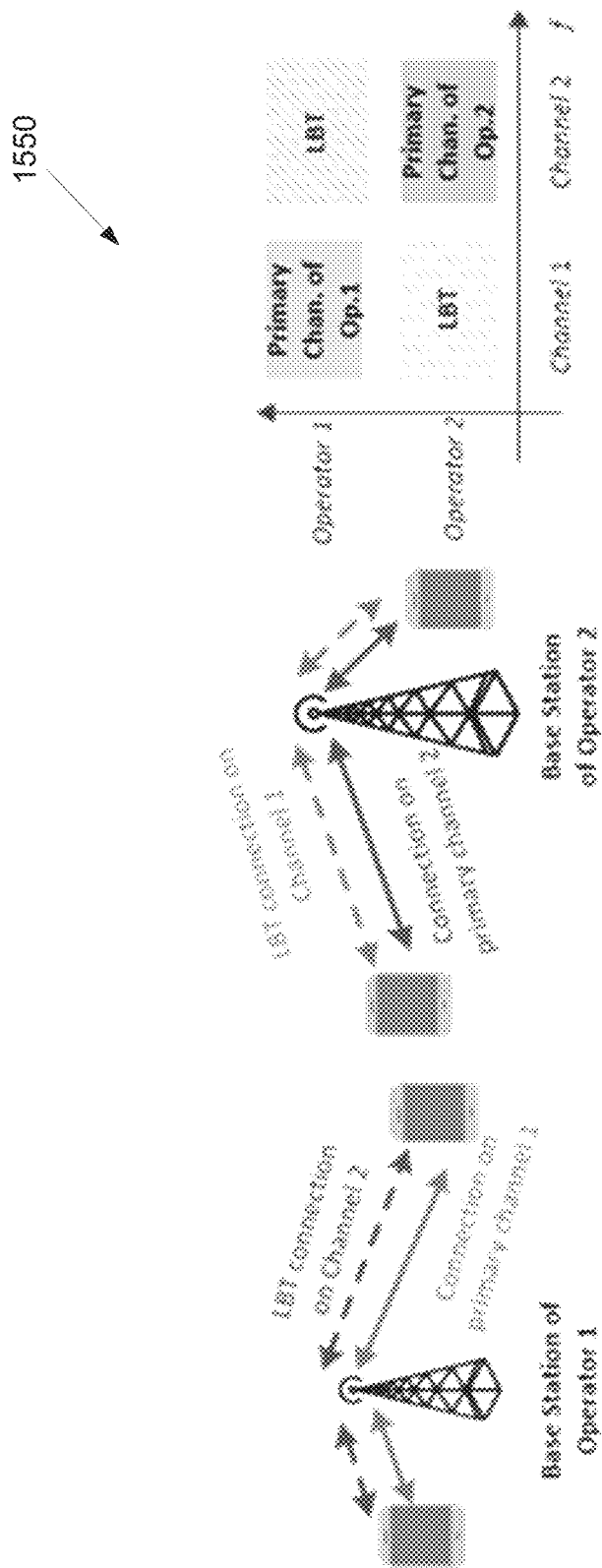
FIG. 15B illustrates LBT and TDD user coexistences via spectrum sharing according to embodiments of the present disclosure.

FIG. 15B illustrates LBT and TDD user coexistences 1550 via spectrum sharing according to embodiments of the present disclosure. The embodiment of the LBT and TDD users coexistence 1550 illustrated in FIG. 15B is for illustration only. FIG. 15B does not limit the scope of this disclosure to any particular implementation.

FIG. 15A shows an orthogonal channel allocation scheme, where channel 1 is allocated to operator 1 and channel 2 is allocated to operator 2. Spectrum utilization can be improved with an LBT scheme.

FIG. 15B shows an example of spectrum sharing. In the spectrum sharing scheme, channel 1 is allocated to operator 1 as a primary channel, and channel 2 is allocated to operator 2 as a primary channel also. Thus, operator 1 and operator 2 are the primary user of channel 1 and channel 2 respectively. When a channel is not occupied by the primary user, other users can utilize the channel for higher spectrum efficiency. The users attempting to access a non-primary channel are called secondary users. For example, when channel 1 is not used by operator 1, operator 2 can utilize channel 1 for data transmission or signaling. Operator 2 is the secondary user of channel 1.

The applicable scenarios of the embodiments of the present disclosure are not limited to the ones shown in FIG. 15A and FIG. 15B. The present disclosure is also applicable for but not limited to the scenarios, a single channel for two operators, a single channel for multiple operators, and multiple channels for multiple operators.

Listen-Before-Talk (LBT) Procedure

In the channel reuse or opportunistic access by secondary users, LBT schemes are designed to avoid interference to a primary user. In LBT schemes, a secondary user needs to probe the status of the channel, that is, whether the channel is already used by the primary user. LBT can be implemented via different methods, and energy detection is one example of the methods. The LBT operation includes of two components. First, the secondary user needs to observe the radio environment; second, the observations are used to calculate the clear channel assessment (CCA) metrics, such as the energy. The energy can be evaluated in terms of the second order statistics of the observations. Other metrics can also be used in CCA. The other metrics include but not limited to the cyclostatistics of the observations, skewness, and kurtosis.

Figure 16:
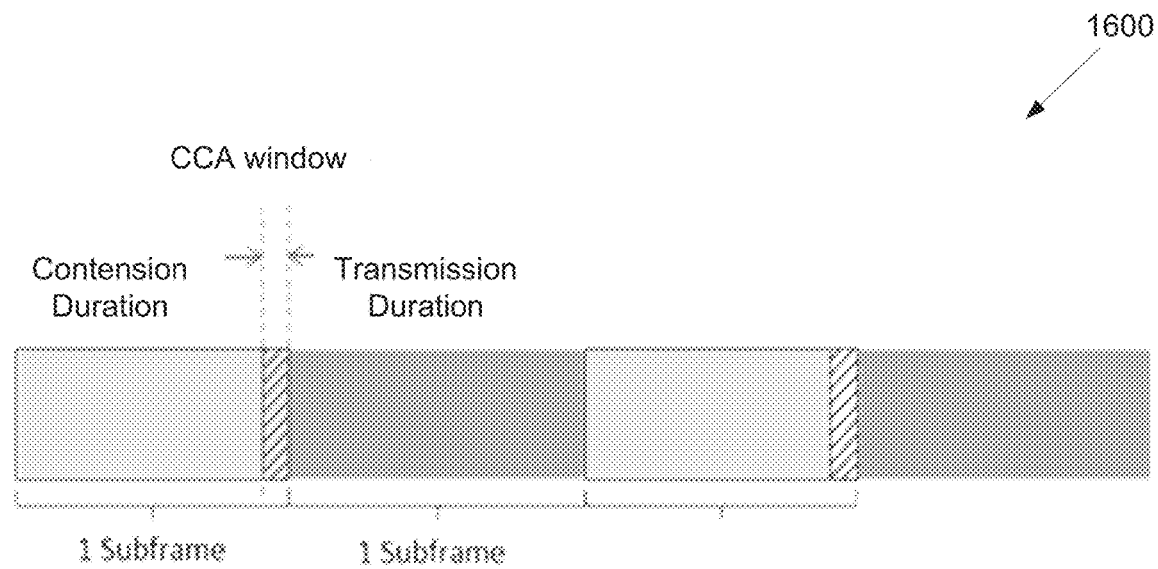
FIG. 16 illustrates an LBT operation according to embodiments of the present disclosure.

FIG. 16 illustrates an LBT operation 1600 according to embodiments of the present disclosure. The embodiment of the LBT operation 1600 illustrated in FIG. 16 is for illustration only. FIG. 16 does not limit the scope of this disclosure to any particular implementation.

Figure 18:
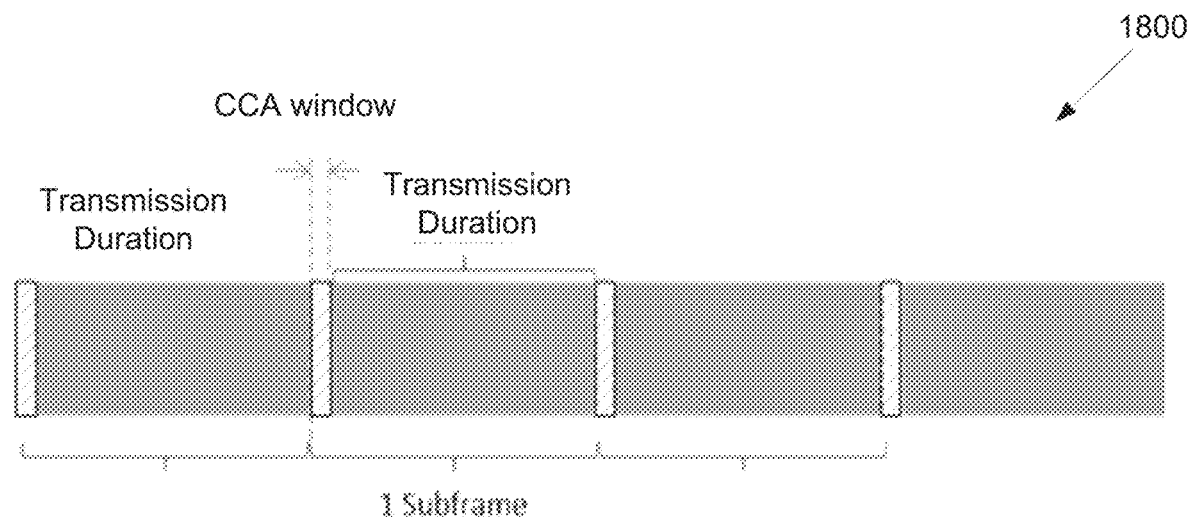
FIG. 18 illustrates another LBT operation according to embodiments of the present disclosure.
Figure 19:
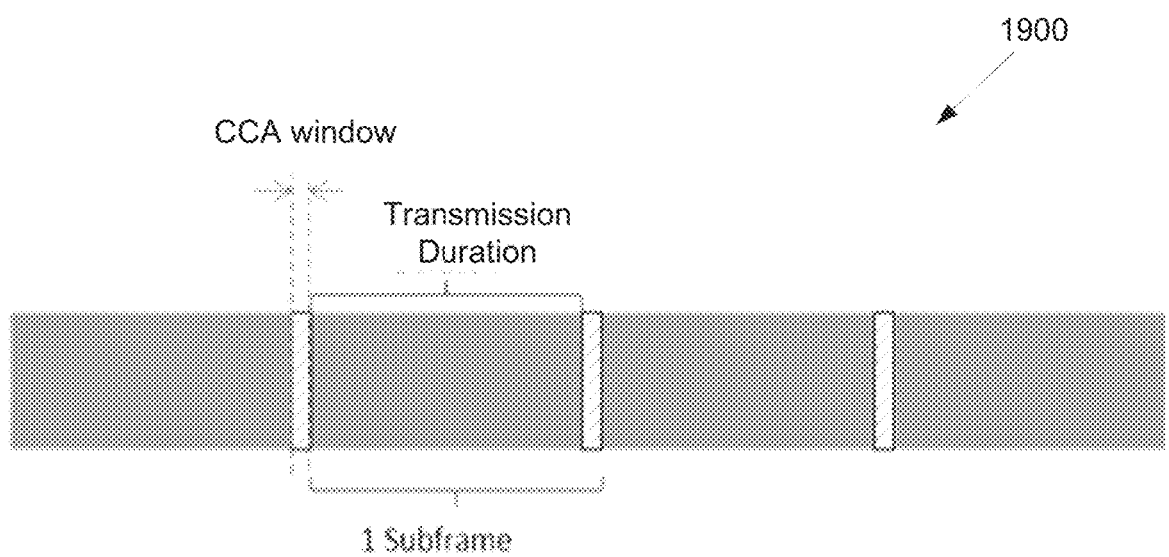
FIG. 19 illustrates yet another LBT operation according to embodiments of the present disclosure.

Three example embodiments of LBT schemes are plotted in FIG. 16, FIG. 18, and FIG. 19.

The first embodiment of LBT scheme is shown in FIG. 16. In this embodiment, CCA is performed at the end of a subframe specially allocated for the detection. The CCA subframe is labeled in gray in FIG. 16. The CCA is not conducted on the full length of the subframe. Only a portion of the subframe is used for CCA which is called as CCA window marked by the shadow area. The length of the CCA window is equal to $T_c$. As an example, energy is taken as the CCA metric. If the detected energy is smaller than a threshold, the secondary user may transmit on the channel in the following subframe.

The transmission subframe is labeled in blue. Two examples of clear channel assessment procedures are as follows.

In one example of LBT Procedure 1, the energy is calculated in the end of the detection window. Then, the calculated energy is compared with a threshold.

In one example of LBT Procedure 2, the detection window of length $T_c$ is divided into $N_{init}$ slots and each time slot is equal to $T_s = T_c N_{init}$ where $N_{init}$ is a constant integer number. The secondary user may transmit data or controlling signal on the channel, after the counter N is zero in step 4; The counter N is adjusted by CCA according to the steps below. The below steps shows CCA countdown procedure: (step 1) set $N=N_{init}$; (step 2) if N>0 and the transmitter on the secondary channel chooses to decrement the counter, set N=N−1; (step 3) detect energy for $T_s$. If the energy is larger than the threshold, go to step 1; else, go to step 5; (step 4) if N=0, stop; else, go to step 2; (step 5) perform CCA until the slots of the duration $T_s$ are detected to be idle; and (step 6) if the channel is sensed to be available during the slot durations of $T_s$, go to step 4; else, go to step 5.

If the CCA shows channel is sensed to be idle, the transmission can start in the following subframe. FIG. 16 shows the transmission period on the channel is equal to one subframe. The transmission period can be modified to be the length which is equal to a portion of a subframe or multiple subframes. After the transmission period terminates, a new round of CCA is performed based on the procedure shown above. An example of LBT procedure 2 is the LAA LBT procedure.

Figure 17:
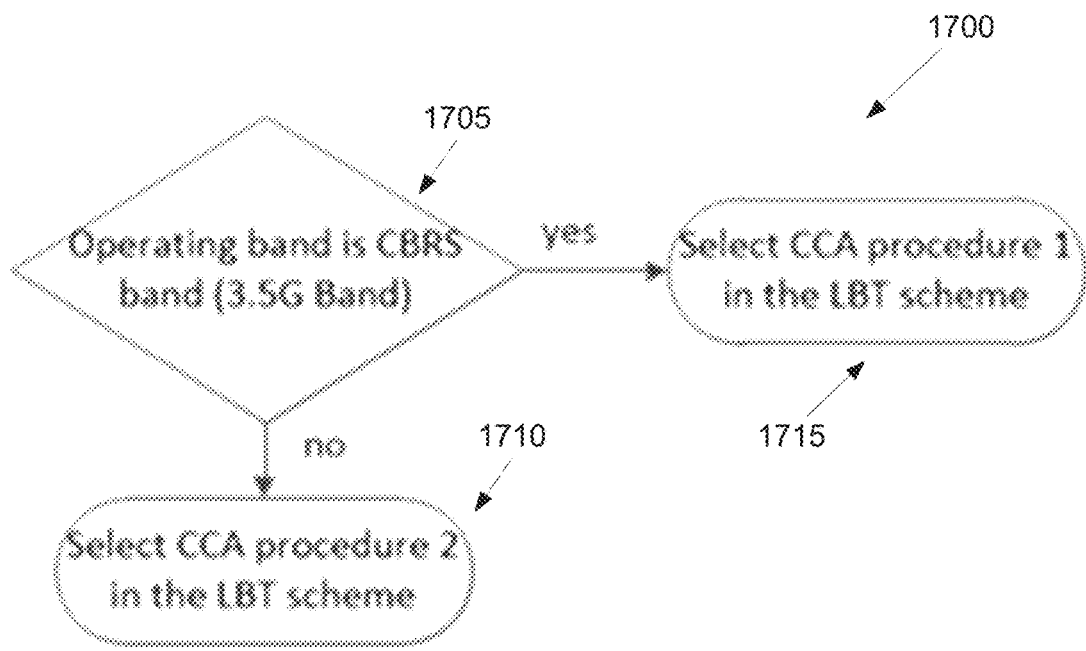
FIG. 17 illustrates an LBT procedure selection according to embodiments of the present disclosure.

FIG. 17 illustrates an LBT procedure selection 1700 according to embodiments of the present disclosure. The embodiment of the LBT procedure selection 1700 illustrated in FIG. 17 is for illustration only. FIG. 17 does not limit the scope of this disclosure to any particular implementation.

As illustrated in FIG. 17, the LBT procedures determines whether an operating band is CBRS band (3.5G Band) at step 1705. At step 1715, the LBT procedures select CCA procedure 1 in the LBT scheme at step 1715 if the operating band in the CBRS band. At 1710, the LBT procedures select CCA procedure 2 in the LBT scheme if the operating band is the CBRS band.

FIG. 17 shows an LBT procedure selection scheme. In a wireless communication system, there can be multiple operating bands on which LBT schemes need to be implemented. For example, the two operating bands are the 3.5 GHz Band (CBRS band) and 5 GHz unlicensed band. Different LBT scheme can be applied on different operating band. For example, the LBT scheme on 3.5 GHz band can be LBT procedure 1 because the LBT users are sharing spectrum with other users operating with LTE frame structure 2. The FS2 users' frame structure are assumed aligned in time domain, hence an LBT procedure with random backoff with a contention window may not be necessary.

The LBT scheme on 5 GHz can be an LBT procedure 2 such as the LAA LBT scheme as the LBT user needs to coexist other users operating with LTE frame structure 3 (LAA) or Wi-Fi users. Other variations are possible such as a variant of LBT procedure 2 is used for 3.5 GHz while the LAA LBT procedure is used for 5 GHz. One example of the variant of LBT procedure 2 for 3.5 GHz is that fixed contention window size is assumed instead of a variable one. Another example of the variant of LBT procedure 2 for 3.5 GHz is the shorter contention window sizes as compared to those of the LAA LBT procedure.

FIG. 18 illustrates another LBT operation 1800 according to embodiments of the present disclosure. The embodiment of the LBT operation 1800 illustrated in FIG. 18 is for illustration only. FIG. 18 does not limit the scope of this disclosure to any particular implementation.

FIG. 18 shows the second embodiment of the LBT scheme. There is no whole subframe specially allocated for the CCA. A secondary user performs the CCA at the beginning of each subframe. In FIG. 18, the vertical shadow bars denote the CCA windows. The CCA window may be no less than a predetermined/configurable value, e.g. 4 µs. If the detected energy is smaller than a threshold, the secondary user can begin transmission in the remainder of the subframe. Otherwise, a new round of CCA is performed at the beginning of the next subframe.

FIG. 19 illustrates yet another LBT operation 1900 according to embodiments of the present disclosure. The embodiment of the LBT operation 1900 illustrated in FIG. 19 is for illustration only. FIG. 19 does not limit the scope of this disclosure to any particular implementation.

FIG. 19 shows the third embodiment of the LBT scheme. In the third embodiment, the CCA is performed at the end of a subframe. If the channel is available, the secondary user can transmit from the start of the following subframe. The transmission terminates before the next CCA window. If the detection result shows the channel is not available, there may be no transmission in the following subframe. At the end of the following subframe, another CCA is conducted.

Cell Selection and Synchronization

The cell synchronization is performed with the synchronization signals (PSS, SSS) or the discovery reference signals (PSS, SSS, and CSI-RS). The network intends to periodically transmit or broadcast the reference signals. The intended transmission period is called as DRS scheduling window. The scheduling period is denoted by $T_{drs}$ which is equal to $N_{drs}$ times a-subframe length. ($N_{drs}$ is a positive integer number.) $N_{drs}$ may or may not be equal to the number of subframes within a frame or half of the subframe number.

If there is a primary cell (PCell) and the secondary cell (SCell) and PCell are in the same band, the synchronization signals (PSS, SSS) are transmitted on the PCell. The secondary cell (SCell) synchronization can be based on synchronization on PCell.

If the PCell and SCell are not in the same band, the synchronization signals (PSS, SSS) need to be transmitted on both the PCell and the SCell. If there is no PCell, the synchronization signals (PSS, SSS) are transmitted the SCell.

If the discovery reference signals are transmitted on secondary cells over CBRS band, the signals can be used by the UE to achieve synchronization. The network tries to schedule transmission of DRS periodically. On the secondary cells, the transmission needs to defer to the activities of primary users. Thus, the secondary channel may not always be available for the transmission. The DRS signal may be scheduled on the first available subframe within a DRS scheduling window.

Figure 20:
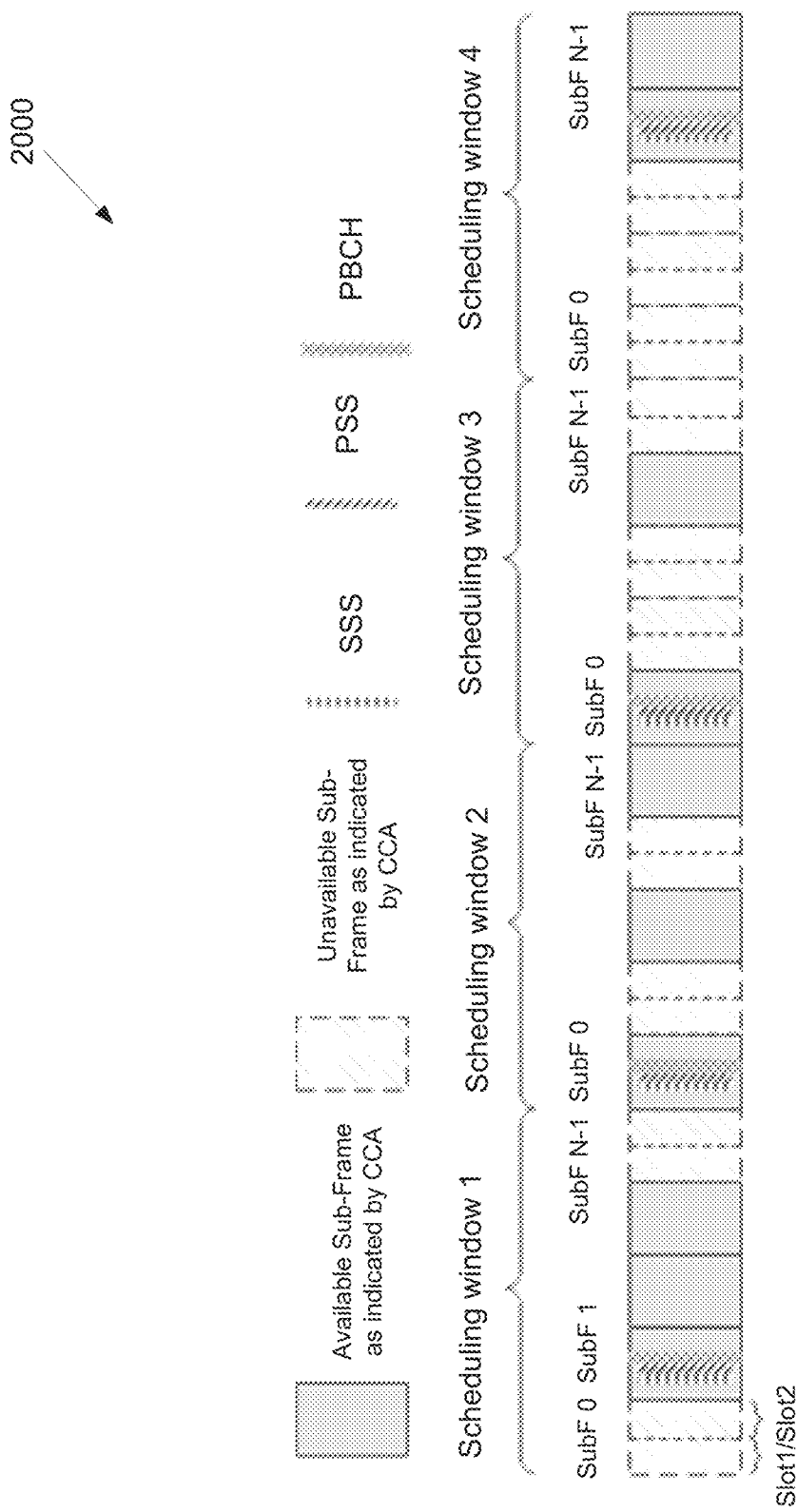
FIG. 20 illustrates a DRS transmission according to embodiments of the present disclosure.

FIG. 20 illustrates a DRS transmission 2000 according to embodiments of the present disclosure. The embodiment of the DRS transmission 2000 illustrated in FIG. 20 is for illustration only. FIG. 20 does not limit the scope of this disclosure to any particular implementation.

FIG. 20 illustrates an example of DRS transmission. As illustrated in FIG. 20, the purple color means the channel is available for the secondary user in the subframe duration. The gray shadow area means the channel is not available for the secondary user. The horizontal red line labeled bar denotes the resource elements allocated for SSS. PSS is labeled by the green back slices. The vertical bar labeled with blue grid mean the resource elements for PBCH. As shown in FIG. 20, subframe 1 is the first available subframe in Scheduling window 1. The PSS and SSS are transmitted in subframe 1. Subframe 0 is the first available subframe n scheduling window 2. Thus, PSS and SSS are transmitted in subframe 0.

The size of the scheduling window and the periodicity of the scheduling window can be fixed or configurable. If the LBT is implemented in a 3GPP defined system (e.g. regulation mandates that 3GPP-defined LAA LBT is implemented in a particular band), the scheduling window and the periodicity can be in the same as those defined in LAA. If the LBT is implemented in non-3GPP systems (e.g. regulation does not mandate that 3GPP-defined LAA LBT is implemented in a particular band, hence other LBT schemes are allowed), the scheduling window size and periodicity can be different than those defined in LAA. In particular, the scheduling window size can also be configurable instead of a fixed size as in LAA.

The configuration of the scheduling window can depend on one or more of the following aspects. In one example, the traffic load of the primary user can be taken as one criterion. If the traffic load of the primary user is high, the occurrence of available subframes is smaller. Thus, the system needs to make the scheduling window may be shorter such that successful DRS delivery probability is increased. If the traffic load is low, the scheduling window can be longer.

In another example, the coherence time of the fading channel can also be taken as the criteria based on which the system modifies the window size. If the coherence time is long, the DRS transmission scheduling window may be larger. If the coherence time is short, the scheduling window may be smaller.

FIG. 20 shows the example in which the synchronization signal SSS/PSS and MIB delivery physical channel PBCH are transmitted at the same frequency. In the present disclosure, the transmission frequencies of SSS/PSS and PBCH can be different. For example, the network can schedule one time of PBCH transmission in every two scheduling windows. If the scheduling window is small and/or MIB information to be updated is in small size, PBCH transmission can be scheduled in more than two scheduling windows. If PCell exists and MIB information is delivered on PCell, there could be no PBCH transmission on the secondary cell.

Figure 21:
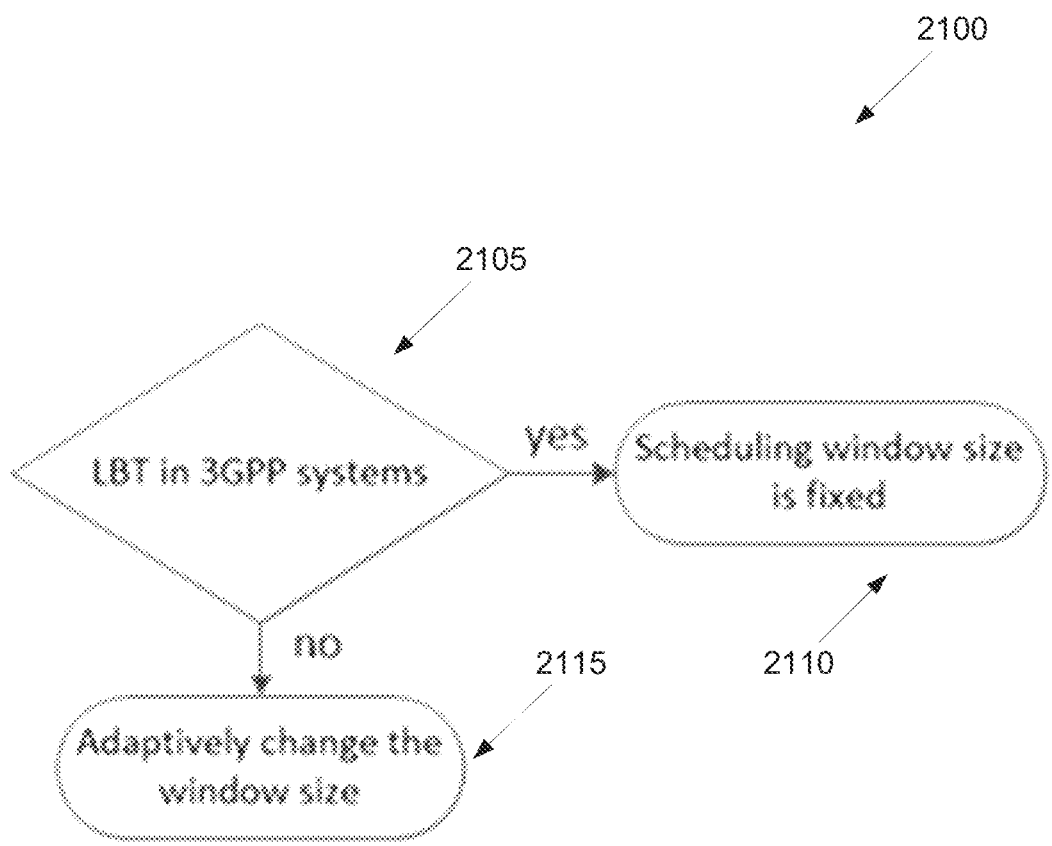
FIG. 21 illustrates a flowchart of a method for controlling DRS scheduling window size according to embodiments of the present disclosure.

FIG. 21 illustrates a flowchart of a method 2100 for controlling DRS scheduling window size according to embodiments of the present disclosure. The embodiment of the method 2100 illustrated in FIG. 21 is for illustration only. FIG. 21 does not limit the scope of this disclosure to any particular implementation. FIG. 21 shows an example of the scheduling window size control.

As illustrated in FIG. 21, the method determines whether LBT is in 3GPP system at step 2105. At step 2110, the method schedules that a window size is fixed. At step 2115, the method adaptively changes the window size.

A. Scheduling in the LBT Scheme

Scheduling in an LBT scheme is a component especially for the transmission on secondary channels. The scheduling may adopt different implementation schemes which depend on whether a primary channel exists. Furthermore, the different CCA methods affect the scheduling design. The present disclosure presents multiple embodiments of scheduling schemes which applicable for different scenarios (existence of primary channels, and different CCA methods). The application of the present disclosure may include but are not limited to the shown embodiments.

B-1. Cross Scheduling Secondary Channels by a Primary Channel for LBT Embodiment 1

Figure 22:
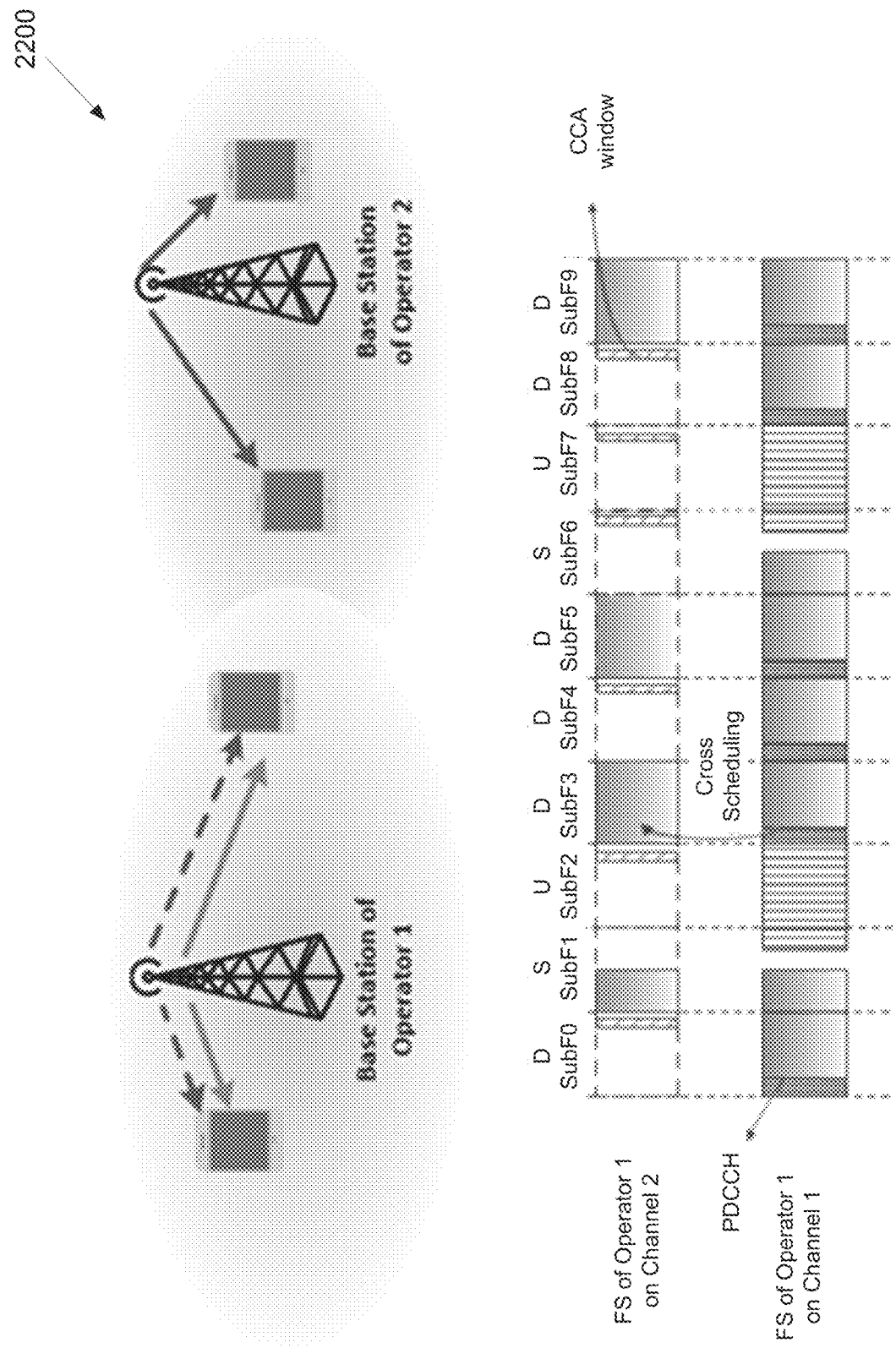
FIG. 22 illustrates a cross scheduling by a primary channel for LBT according to embodiments of the present disclosure.

FIG. 22 illustrates a cross scheduling 2200 by a primary channel for LBT according to embodiments of the present disclosure. The embodiment of the cross scheduling 2200 illustrated in FIG. 22 is for illustration only. FIG. 22 does not limit the scope of this disclosure to any particular implementation.

FIG. 22 shows an embodiment in which a primary channel exists. Channel 1 is the primary channel of the base station belonging to operator 1 and channel 2 is the primary channel of the base station belonging to operator 2. The base station belonging to operator 1 is called as operator 1 for short, and the base station belonging to operator 2 is called as operator 2 for short. Channel 2 is the secondary channel of the base station 1. The frame structures for operator 1 downlink on both channel 1 and channel 2 are shown on the bottom part of FIG. 22.

As illustrated in FIG. 22, the vertical rectangular with purple shadow denotes the PDCCH. The red blocks denote the resource elements which are used for transmitting other physical channels such as PDSCH, PBCH, PSS, and SSS. The blocks with interleaved vertical red and white bars denote the resource elements used for uplink transmission. The vertical narrow rectangles with green slashes denote the time window allocated for CCA. The green blocks mean the subframes during which the secondary channel is available.

For operator 1, the frame structure and physical layer procedure on channel 1 can be the same with the frame structure and physical layer procedure defined in LTE or 5G NR standards. The frame structure configuration and physical channel procedure on channel 2 follows the descriptions below.

On channel 2, operator 1 needs to perform CCA to probe whether channel 2 is already occupied by operator 2. The CCA is performed within detection window of length $T_c$. Following the detection window, there is a gap of $T_p$ before the start of the next subframe. The gap of $T_p$ is designed for covering the maximum processing delay on hardware. The factors which could cause the delay include but are not limited to the modulation, precoding.

The controlling and data physical channels of base station 1 on channel 2, such as PDCCH and PDSCH are described below. In one example of PDCCH procedure of operator 1 on channel 2, both DL DCI and UL DCI are transmitted via PDCCH on the channel 1. Alternatively, the DL DCI and UL DCI for base station 1 on channel 2 can also be conveyed via ePDCCH on channel 1. In another example of PDSCH procedure of operator 1 on channel 2: CCA is performed on channel 2. If the detected energy is smaller than a threshold, operator 1 may utilize channel 2 for transmission at the following subframe. If the energy is higher than the threshold, operator 1 may not transmit on channel 2; and FIG. 22 shows that CCA is performed at the end of Subframe 0, 2, 4, 6, 7 and 8. The detection result shows channel 2 is available for operator 1 in Subframe 1, 3, 5, and 9. Therefore, operator 1 transmits in Subframe 1, 3, 5, and 9. Since the CCA results show channel 2 is not available for operator 1. Operator 1 may not do the transmission on channel 2 in Subframe 7 and 8.

B-2. Self-Scheduling On Secondary Channels for LBT Embodiment 1

Figure 23:
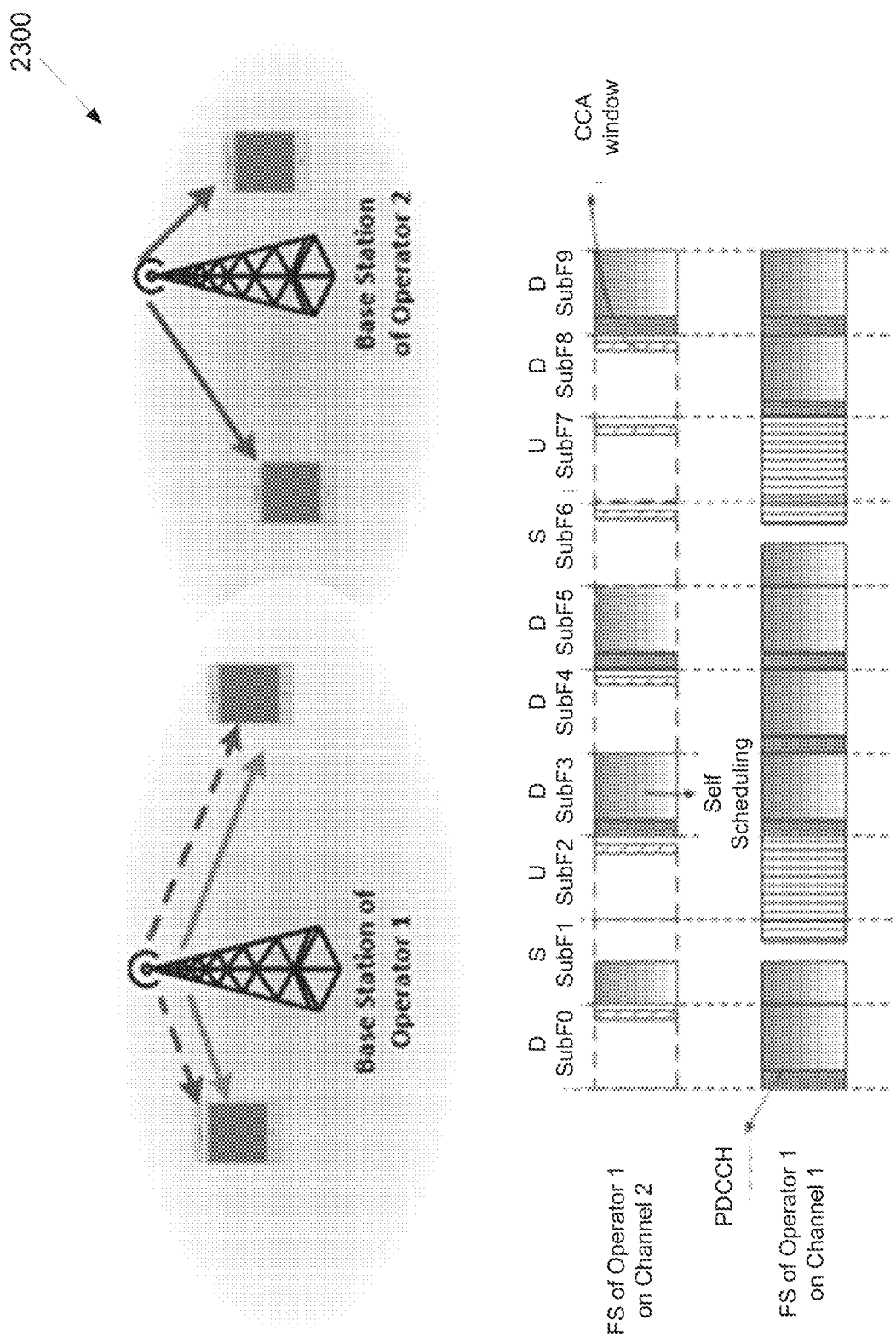
FIG. 23 illustrates a self-scheduling on the secondary channel with LBT according to embodiments of the present disclosure.

FIG. 23 illustrates a self-scheduling 2300 on the secondary channel with LBT according to embodiments of the present disclosure. The embodiment of the self-scheduling 2300 illustrated in FIG. 23 is for illustration only. FIG. 23 does not limit the scope of this disclosure to any particular implementation.

FIG. 23 shows that channel 1 and channel 2 are the primary channel of operator 1 and operator 2, respectively. Channel 2 is the secondary channel of operator 1. Operator 1 can transmit on channel 2 via an LBT scheme. The transmission on the secondary channel is self-scheduled.

The controlling and data physical channels of operator 1 on channel 2, such as PDCCH and PDSCH, are described below. In one example of PDCCH procedure of operator 1 on channel 2, both DL DCI and UL DCI are transmitted via PDCCH on the channel 2. In another example of PDSCH procedure, same with the PDSCH procedure described in Section [0220].

B-3. Scheduling in LBT Schemes Without Primary Channels for LBT Embodiment 1

Figure 24:
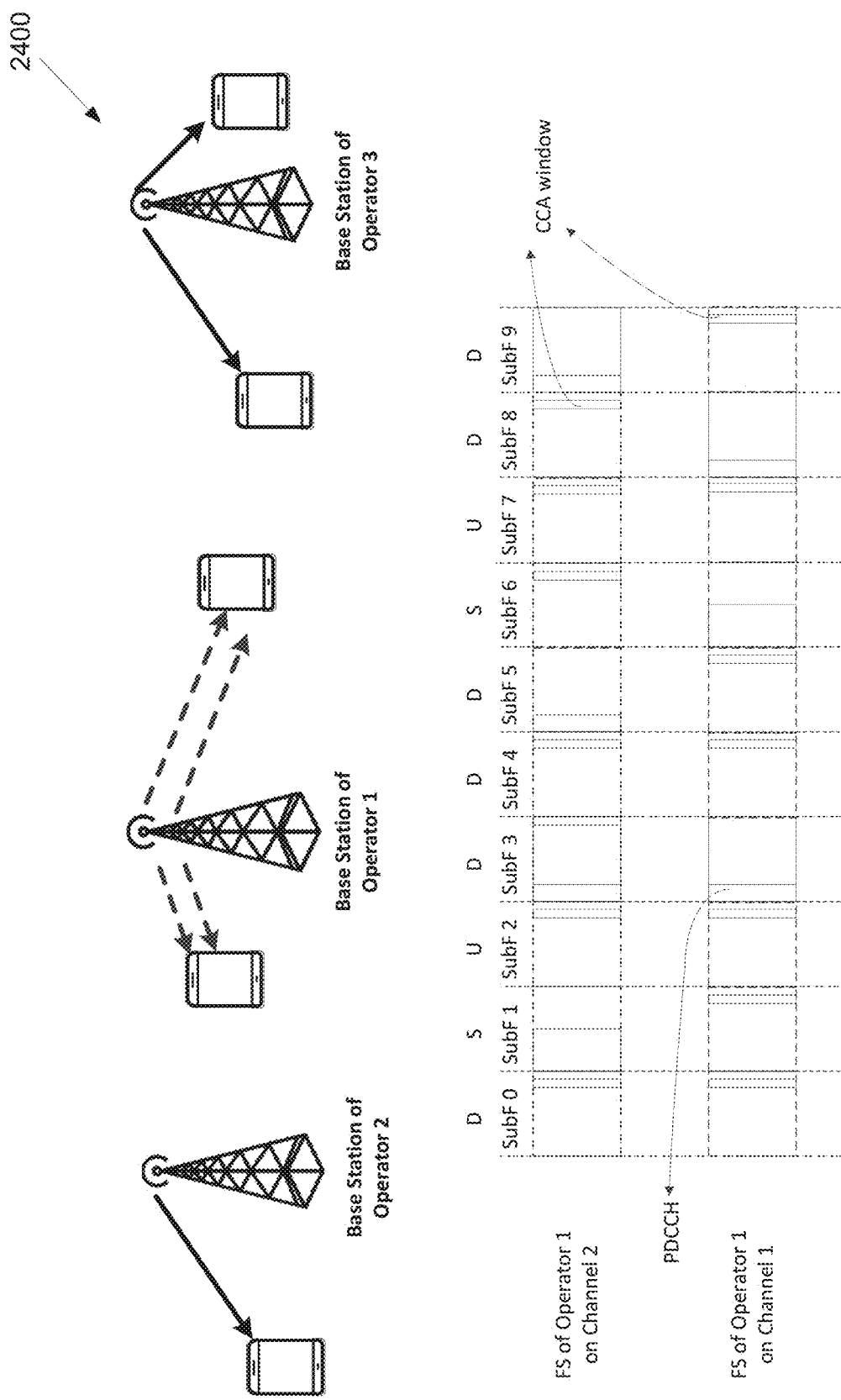
FIG. 24 illustrates a self-scheduling without primary channels for LBT according to embodiments of the present disclosure.

FIG. 24 illustrates a self-scheduling 2400 without primary channels for LBT according to embodiments of the present disclosure. The embodiment of the self-scheduling 2400 illustrated in FIG. 24 is for illustration only. FIG. 24 does not limit the scope of this disclosure to any particular implementation.

FIG. 24 shows that channel 1 and channel 2 are the primary channel of operator 2 and operator 3 respectively. Channel 1 and channel 2 are the secondary channels of operator 1. There is no primary channel for operator 1. FIG. 24 shows the self-scheduling is performed on two secondary channels of operator 1, channel 1 and channel 2.

Operator 1 needs to detect whether channel 1 and channel 2 are already occupied by PUs. The vertical narrow rectangles with red slashes denote the CCA windows on channel 1 and the vertical narrow rectangles with green slashes denote the CCA windows on channel 2. The CCA windows on channel 1 and channel 2 may or may not be aligned in time. PDCCH and PDSCH of operator 1 on channel 1 and channel 2 are described below. In one example of PDCCH procedure of operator 1: both DL DCI and UL DCI on channel 1 are transmitted via PDCCH on channel 1; and both DL DCI and UL DCI on channel 2 are transmitted via PDCCH on channel 2. In another example, PDSCH procedure is the same as the PDSCH procedure described in Section [0220].

B-4. Cross Scheduling Secondary Channels by a Primary Channel for LBT Embodiment 2

Figure 25:
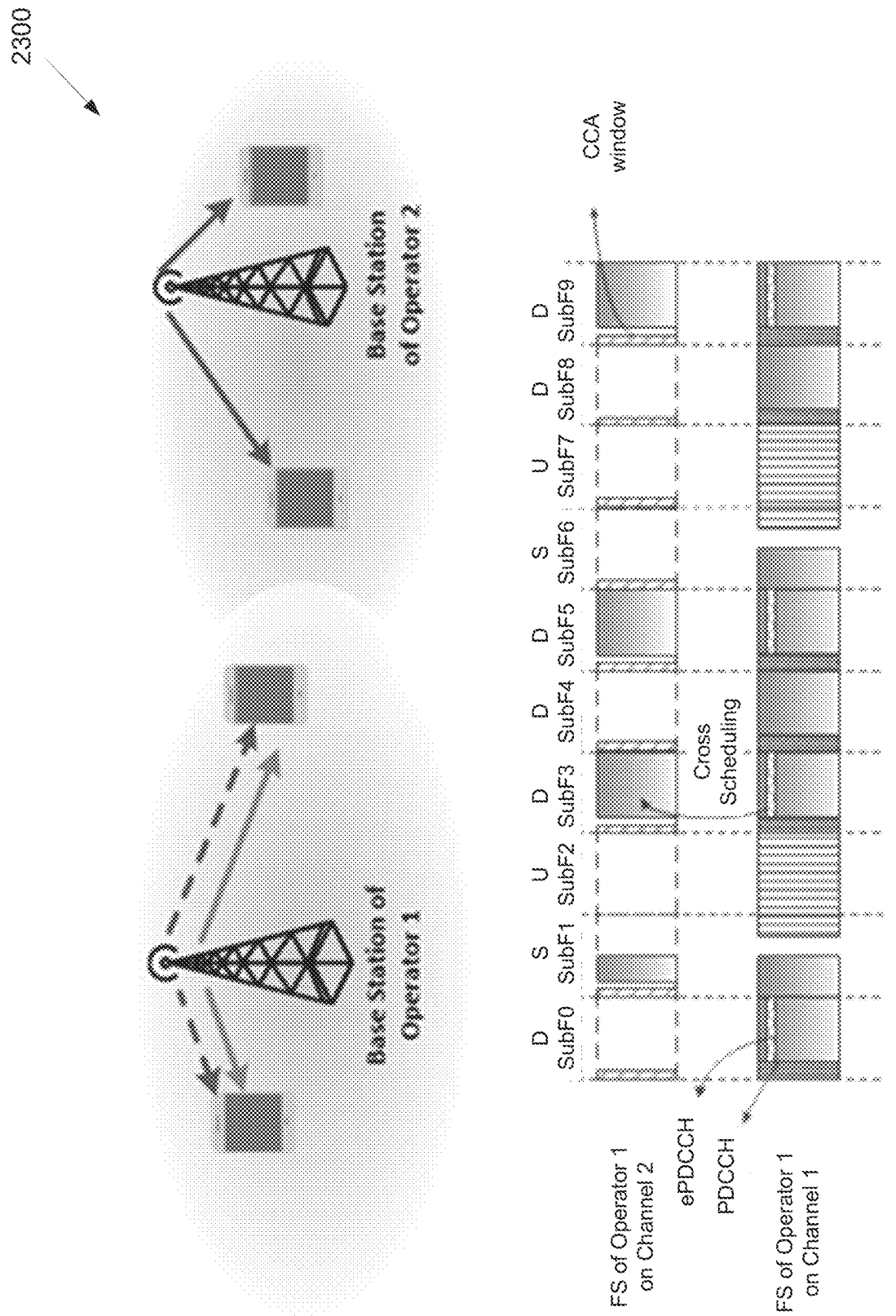
FIG. 25 illustrates a cross scheduling on the secondary channel for LBT according to embodiments of the present disclosure.

FIG. 25 illustrates a cross scheduling 2500 on the secondary channel for LBT according to embodiments of the present disclosure. The embodiment of the cross scheduling 2500 illustrated in FIG. 25 for illustration only. FIG. 25 does not limit the scope of this disclosure to any particular implementation.

FIG. 25 shows that channel 1 and channel 2 are the primary channel of operator 1 and operator 2, respectively. Channel 2 is the secondary channel of operator 1. Operator 1 can transmit on channel 2 via an LBT scheme.

Before transmitting on channel 2, operator 1 probes whether channel 2 is available. The probing is implemented via CCA. The CCA window is equal to $T_c$. The detection window starts from the first symbol of a subframe, and ends before the start of the second symbol. If detected energy is smaller than a threshold, operator 2 starts transmission from the second symbol. PDCCH and PDSCH of operator 1 on channel 2 are described below. In one example of PDCCH procedure of operator 1 on channel 2, the DL DCI and UL DCI for operator 1 on channel 2 can also be conveyed via ePDCCH on channel 1. In another example, PDSCH procedure of operator 1 on channel 2 is the same as the PDSCH procedure described in the aforementioned embodiment of B-1.

B-5. Self-Scheduling on Secondary Channels for LBT Embodiment 2

Figure 26:
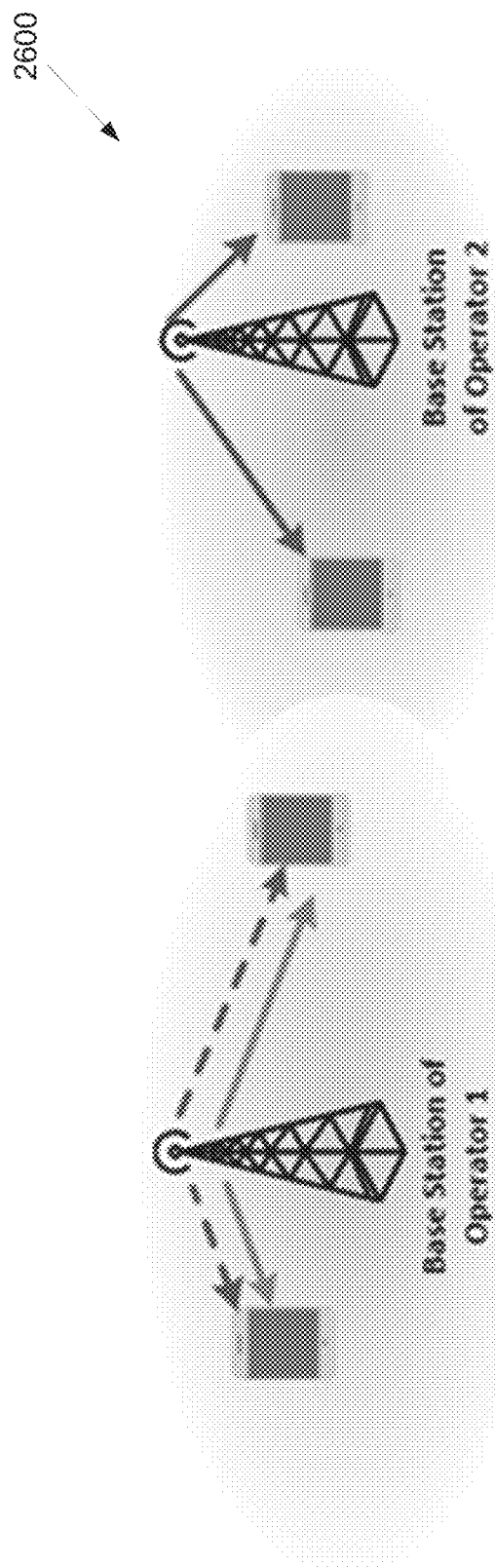
FIG. 26 illustrates a self-scheduling on the secondary channel for LBT according to embodiments of the present disclosure.
Figure 26:
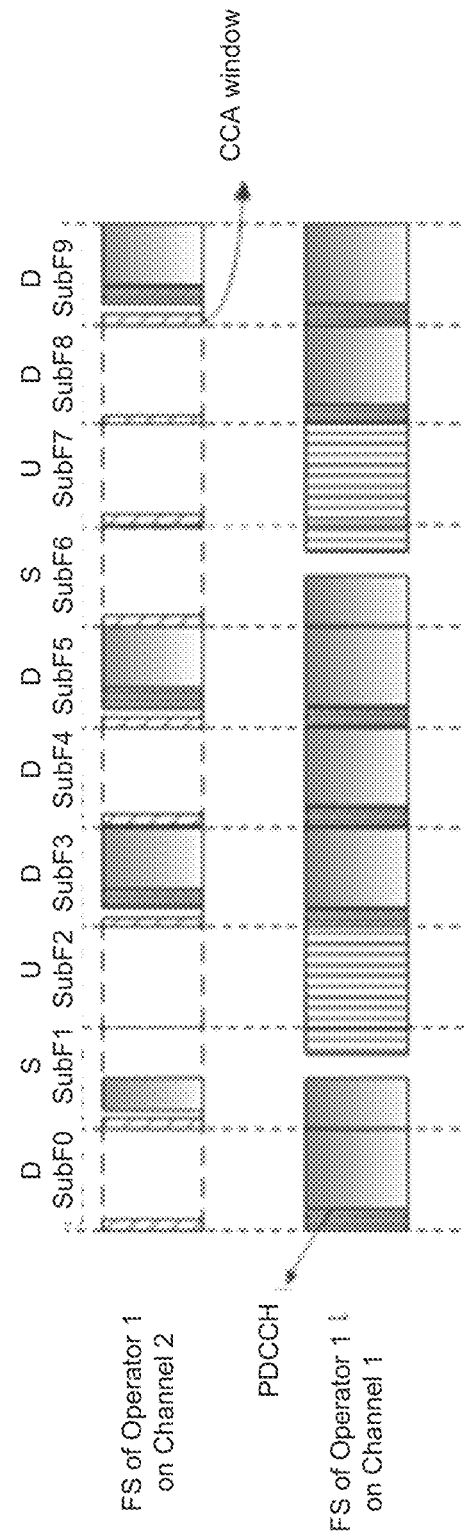

FIG. 26 illustrates a self-scheduling 2600 on the secondary channel for LBT according to embodiments of the present disclosure. The embodiment of the self-scheduling 2600 illustrated in FIG. 26 is for illustration only. FIG. 26 does not limit the scope of this disclosure to any particular implementation.

FIG. 26 shows that channel 1 and channel 2 are the primary channel of operator 1 and operator 2, respectively. Channel 2 is the secondary channel of operator 1. Operator 1 can transmit on channel 2 via an LBT scheme.

Before transmitting on channel 2, operator 1 probes whether channel 2 is available. The probing is implemented via CCA. The CCA window is equal to $T_c$. The detection window starts from the first symbol of a subframe, and ends before the start of the second symbol. If detected energy is smaller than a threshold, operator 2 starts transmission from the second symbol. PDCCH and PDSCH of operator 1 on channel 2 are described below. In one example of PDCCH procedure of operator 1 on channel 2, the DL DCI and UL DCI for operator 1 on channel 2 can also be conveyed via ePDCCH on channel 1.

In another example, PDSCH procedure of operator 1 on channel 2 is the same as the PDSCH procedure described in the aforementioned embodiment of section B-1.

Figure 27:
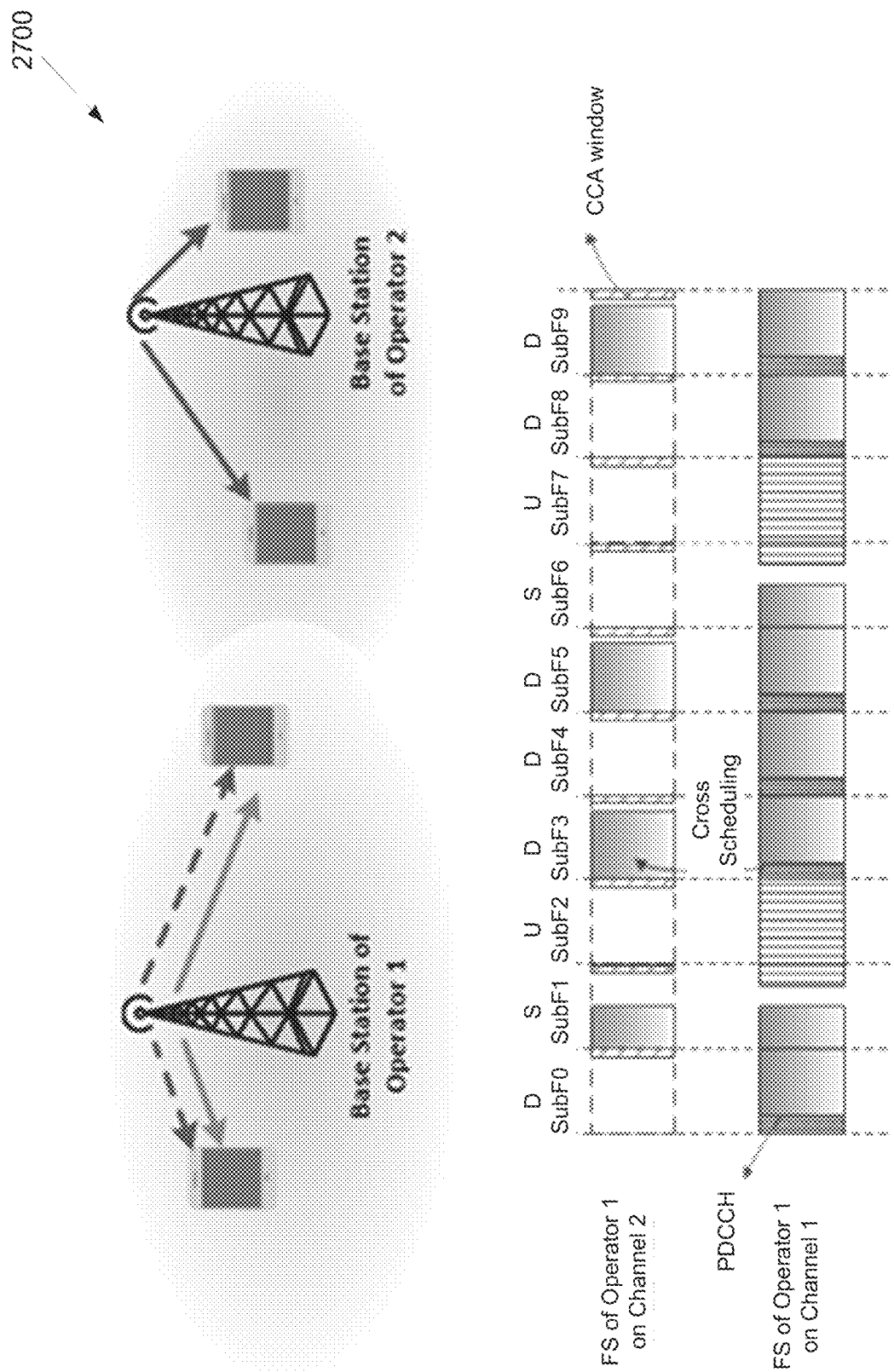
FIG. 27 illustrates a cross scheduling on the secondary channel for LBT according to embodiments of the present disclosure.

B-6. Cross Scheduling Secondary Channels by a Primary Channel for LBT Embodiment FIG. 27 illustrates a cross scheduling 2700 on the secondary channel for LBT according to embodiments of the present disclosure. The embodiment of the cross scheduling 2700 illustrated in FIG. 27 is for illustration only. FIG. 27 does not limit the scope of this disclosure to any particular implementation.

FIG. 27 shows that channel 1 and channel 2 are the primary channel of operator 1 and operator 2, respectively. Channel 2 is the secondary channel of operator 1. Operator 1 can transmit on channel 2 via an LBT scheme.

FIG. 27 shows that CCA on channel 2 which is conducted by operator 1 at the end of a subframe. If the detected energy is smaller than a threshold, operator 1 transmits since the following subframe and ends before the CCA window. PDCCH and PDSCH of operator 1 on channel 2 are described below. In one example of PDCCH procedure of operator 1 on channel 2, the DL DCI and UL DCI for base station 1 on channel 2 can also be conveyed via PDCCH on channel 1.

In another example, PDSCH procedure of operator 1 on channel 2 is the same as the PDSCH procedure described in Section B-1. For self-scheduling case on channel 2 for LBT embodiment 2 and 3, the physical layer procedure may be same as that on channel 2 for LBT embodiment 1.

Although the present disclosure has been described with an exemplary embodiment, various changes and modifications may be suggested to one skilled in the art. It is intended that the present disclosure encompass such changes and modifications as fall within the scope of the appended claims.

None of the description in this application may be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) for a coexistence operation in a wireless communication system, the BS comprising:
   at least one processor configured to:
      perform a first measurement of first signals received from neighbor BSs over channels that are shared with the neighbor BSs, and
      generate, based on the first measurement of the first signals, a registration request comprising group information that includes a first measurement report and a type of measurement capabilities for the first measurement report; and
   a transceiver operably connected to the at least one processor, the transceiver configured to:
      transmit, to a network entity, the registration request comprising the group information that includes the first measurement report of the first signals and the type of measurement capabilities, and
      receive, from the network entity, a spectrum access grant corresponding to the registration request,
   wherein:
      the at least one processor is further configured to perform a second measurement of second signals received from the neighbor BS over the channels that are shared with the neighbor BSs; and
      the transceiver is further configured to transmit, to the network entity, a second measurement report comprising the second measurement of the second signals and at least one measurement report from user equipments (UEs) in a cell of the BS.

2. The BS of claim 1, wherein:
   the transceiver is further configured to receive the at least one measurement report from the UEs in the cell of the BS; and
   the at least one processor is further configured to generate the second measurement report comprising the second measurement of the second signals received from the neighbor BSs over the channels that are shared with the neighbor BSs and the at least one measurement report received from the UEs.

3. The BS of claim 1, wherein:
the BS is a citizen broadband radio service device (CBSD) in a communication system operated on a shared spectrum; and
the network entity is one of a spectrum access system (SAS) or a coexistence management (CxM) in the communication system operated on the shared spectrum.

4. The BS of claim 1, wherein:
the first measurement report further comprises, based on the first measurement of the first signals, a reference signal strength indicator (RSSI); and
the second measurement report comprises, based on the second measurement of the second signals and the at least one measurement report from the UEs, at least one of an RSRP, an RSRQ, an RSSI, a PID, or a timestamp.

5. The BS of claim 1, wherein the at least one processor is further configured to generate the second measurement report based on at least a data fusion of the at least one measurement report from the UEs in the cell of the BS.

6. The BS of claim 1, wherein:
the at least one processor is further configured to:
perform a listen-before-talk (LBT) operation comprising an energy detection based channel sensing operation, and
generate a channel expansion request based on a result of performing the LBT operation; and
the transceiver is further configured to:
transmit, to the network entity, the channel expansion request,
receive, from the network entity, a channel expansion grant when the channel expansion request is granted by the network entity, and
transmit, to the UEs, information over an expanded channel that is granted by the network entity.

7. The BS of claim 6, wherein a threshold of the energy detection is determined based on a buffer occupancy of a neighbor UE comprising a higher priority than the UEs in the cell of the BS.

8. The BS of claim 1, wherein:
the at least one processor is further configured to determine a time interval for a transmission of discovery reference signal (DRS) among a predefined set of multiple time intervals; and
the transceiver is further configured to transmit, to the UEs, the DRS based on the determined time interval over a downlink channel.

9. A network entity for a coexistence operation in a wireless communication system, the network entity comprising:
a transceiver configured to receive, from a base station (BS), a registration request comprising group information that includes a first measurement report based on a first measurement of first signals and a type of measurement capabilities for the first measure report, wherein the first measurement is performed based on the first signals transmitted from neighbor BSs over channels in which the BS shares with the neighbor BSs; and
at least one processor operably connected to the transceiver, the at least one processor configured to generate a spectrum access grant based on the registration request comprising the group information that includes the first measurement report of the first signals and the type of measurement capabilities,
wherein the transceiver is further configured to:
transmit, to the BS, the spectrum access grant for a second measurement of second signals transmitted from the neighbor BSs over the channels the BS shares with the neighbor BSs performed; and
receive, from the BS, a second measurement report comprising the second measurement of the second signals and at least one measurement report from user equipments (UEs).

10. The network entity of claim 9, wherein:
the BS is a citizen broadband radio service device (CBSD) in a communication system operated on a shared spectrum;
the network entity is one of a spectrum access system (SAS) or a coexistence management (CxM) in the communication system operated on the shared spectrum;
the first measurement report further comprises, based on the first measurement of the first signals, a reference signal strength indicator (RSSI); and
a second measurement report comprises, based on the second measurement of the second signals and the at least one measurement report from the UEs, at least one of an RSRP, an RSRQ, an RSSI, a PID, or a timestamp.

11. The network entity of claim 9, wherein the transceiver is further configured to:
receive, from the BS, a channel expansion request that is determined based on a result of a listen-before-talk (LBT) operation comprising an energy detection based channel sensing operation and a threshold of the energy detection being determined based on a buffer occupancy of a neighbor UE comprising a higher priority than UEs in a cell of the BS; and
transmit, to the BS, a channel expansion grant corresponding to the channel expansion request when the channel expansion request is granted by the network entity.

12. A method of operating a base station (BS) for a coexistence operation in a wireless communication system, the method comprising:
performing a first measurement of first signals received from neighbor BSs over channels that are shared with the neighbor BSs before receipt of a spectrum access grant from a network entity;
generating, based on the first measurement of the first signals, a registration request comprising group information that includes a first measurement report and a type of measurement capabilities for the first measurement report;
transmitting, to a network entity, the registration request comprising the group information that includes the first measurement report of the first signals and the type of measurement capabilities;
receiving, from the network entity, the spectrum access grant corresponding to the registration request;
performing a second measurement of second signals received from the neighbor BSs over the channels that are shared with the neighbor BSs; and
transmitting, to the network entity, a second measurement report comprising the second measurement of the second signals and at least one measurement report from user equipments (UEs) in a cell of the BS after receiving the spectrum access grant from the network entity.

13. The method of claim 12, further comprising:
receiving the at least one measurement report from the UEs in the cell of the BS; and
generating the second measurement report comprising the second measurement of the second signals received from the neighbor BS over the channels that are shared with the neighbor BSs and the at least one measurement report received from the UEs.

14. The method of claim 12, wherein:
the BS is a citizen broadband radio service device (CBSD) in a communication system operated on a shared spectrum; and
the network entity is one of a spectrum access system (SAS) or a coexistence management (CxM) in the communication system operated on the shared spectrum.

15. The method of claim 12, wherein:
the first measurement report further comprises, based on the first measurement of the first signals, a reference signal strength indicator (RSSI); and
a second measurement report comprises, based on the second measurement of the second signals and the at least one measurement report from the UEs, at least one of an RSRP, an RSRQ, an RSSI, a PID, or a timestamp.

16. The method of claim 12, further comprising generating the second measurement report based on at least a data fusion of the at least one measurement report from the UEs in the cell of the BS.

17. The method of claim 12, further comprising:
performing a listen-before-talk (LBT) operation comprising an energy detection based channel sensing operation;
generating a channel expansion request based on a result of performing the LBT operation;
transmitting, to the network entity, the channel expansion request;
receiving, from the network entity, a channel expansion grant when the channel expansion request is granted by the network entity; and
transmitting, to the UEs, information over an expanded channel that is granted by the network entity.

18. The method of claim 17, wherein a threshold of the energy detection is determined based on a buffer occupancy of a neighbor UE comprising a higher priority than UEs in the cell of the BS.

19. The method of claim 12, further comprising:
determining a time interval for a transmission of discovery reference signal (DRS) among a predefined set of multiple time intervals; and
transmitting, to the UEs, the DRS based on the determined time interval over a downlink channel.

* * * * *